(12) United States Patent
Elter et al.

(10) Patent No.: US 9,196,036 B2
(45) Date of Patent: Nov. 24, 2015

(54) DEVICE AND METHOD FOR DETERMINING OBJECTS IN A COLOR RECORDING

(71) Applicant: Fraunhofer-Gesellschaft zur Foerderung der angewandten Forschung e.V., Munich (DE)

(72) Inventors: Matthias Elter, Erlangen (DE); Thorsten Zerfass, Nuremberg (DE); Dirk Steckhan, Munich (DE); Thomas Wittenberg, Erlangen (DE); Christian Muenzenmayer, Nuremberg (DE); Timo Schlarb, Krischroth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 288 days.

(21) Appl. No.: 13/923,171

(22) Filed: Jun. 20, 2013

(65) Prior Publication Data

US 2013/0279789 A1 Oct. 24, 2013

Related U.S. Application Data

(63) Continuation of application No. PCT/EP2011/073583, filed on Dec. 21, 2011.

(30) Foreign Application Priority Data

Dec. 22, 2010 (DE) .......................... 10 2010 063 965

(51) Int. Cl.
*G06K 9/00* (2006.01)
*G06T 7/00* (2006.01)
(Continued)

(52) U.S. Cl.
CPC .......... *G06T 7/0012* (2013.01); *G06K 9/00127* (2013.01); *G06K 9/4652* (2013.01); *G06K 9/6857* (2013.01)

(58) Field of Classification Search
None
See application file for complete search history.

(56) References Cited

U.S. PATENT DOCUMENTS 5,470,751 A * 11/1995 Sakata et al. .................... 436/63
7,796,815 B2 9/2010 Muschler et al.
(Continued)

FOREIGN PATENT DOCUMENTS

WO WO-03/102210 12/2003
WO WO-2005/121863 12/2005

OTHER PUBLICATIONS

Ross et al.,"Automated image processing method for the diagnosis and classification of malaria on thin blood smears", 2006, Med Biol Eng Comput vol. 44, pp. 427-436.*
(Continued)

*Primary Examiner* — Jason Heidemann
(74) *Attorney, Agent, or Firm* — Michael A. Glenn; Perkins Coie LLP

(57) ABSTRACT

A device for determining objects in a color recording has an identifier, a feature extractor and a classifier. The identifier is implemented to identify the connected regions whose size or shape correspond to a predetermined condition from a plurality of connected regions existing in a binary image derived from a color recording based on a size or a shape of these connected regions. The feature extractor is implemented, for each of the identified connected regions, to extract a feature set from the color recording. The classifier is implemented to classify the identified connected regions into at least two disjunct groups based on the extracted feature sets for the identified connected regions.

24 Claims, 17 Drawing Sheets

(51) Int. Cl.
*G06K 9/46* (2006.01)
*G06K 9/68* (2006.01)

(56) References Cited

U.S. PATENT DOCUMENTS

| | | | |
|---|---|---|---|
| 7,831,106 B2* | 11/2010 | Elsner et al. | 382/254 |
| 8,781,184 B2* | 7/2014 | Behrend et al. | 382/128 |
| 2002/0164063 A1 | 11/2002 | Heckman | |
| 2002/0186875 A1 | 12/2002 | Burmer et al. | |
| 2004/2041677 | 12/2004 | Lin et al. | |
| 2006/0063185 A1* | 3/2006 | Vannier | 435/6 |
| 2006/0280352 A1 | 12/2006 | Muschler et al. | |
| 2014/0294280 A1* | 10/2014 | Behrend et al. | 382/133 |

OTHER PUBLICATIONS

Kumarasamy et al., "Robust contour reconstruction of red blood cells and parasites in the automated identification of the stages of malarial infection" 2010, Springer-Verlag, Machine Vision and Applications (2011), vol. 22, pp. 461-469.*

Ernst, , "Einführung in die digitale Bildverarbeitung", München : Franzis, 1991. 234-245.—ISBN 3-7723-5682-6 (no English abstract).

Dempster, A. G. et al., "Using Granulometries in Processing Images of Malarial Blood", IEEE International Symposium on Circuits and Systems ISCAS 2001, vol. 5, May 6-9, 2001, pp. 291-294.

Di Ruberto, C. et al., "Automatic Thresholding of Infected Blood Images Using Granulometry and Regional Extrema", 15th International Conference on Pattern Recognition, vol. 3, Sep. 3-7, 2000, pp. 441-444.

Di Ruberto, C. et al., "Morphological Image Processing for Evaluating Malaria Disease", IWVF-4: Proceedings of the 4th International Workshop on Visual Form, London, UK, 2001. Springer-Verlag, 2001, pp. 739-748.

Di Ruberto, C. et al., "Segmentation of Blood Images Using Morphological Operators", 15th International Conference on Pattern Recognition, vol. 3, Sep. 3-7, 2000, pp. 397-400.

Di Ruberto, Cecilia et al., "Analysis of Infrected Blood Cell Images Using Morphological Operators", Image and Vision Computing, Bd. 20, Nr. 2, Feb. 1, 2002, pp. 133-146.

Diaz, G. et al., "A Semi-Automatic Method for Quantification and Classification of Erythrocytes Infected with Malaria Parasites in Microscopic Images", Journal of Biomedical Informatics 42(2), Jan. 4, 2009, pp. 296-307.

Eden, M. et al., "Feasibility of Computer Screening of Blood Films for the Detection of Malaria Parasites", Bull World Health Organ, 48(2), 1973, pp. 211-218.

Frean, John A., "Reliable Enumeration of Malaria Parasites in Thick Blood Films Using Digital Image Analysis", Malaria Journal, Biomed Central, London, GB, Bd. 8, Nr. 1, Sep. 23, 2009, pp. 218-225.

Halim, S. et al., "Estimating Malaria Parasitaemia from Blood Smear Images", 9th International Conference on Control, Automation, Robotics and Vision ICARCV '06, Dec. 5-8, 2006, pp. 1-6.

Le, M.-T. et al., "A Novel Semi-Automatic Image Processing Approach to Determine *Plasmodium Falciparum*Parasitemia in Giemsa-Stained Thin Blood Smears", BMC Cell Biology, BioMed Central, 9:15, Mar. 28, 2008, 12 pp.

Otsu, Nobuyuki, "A Threshold Selection Method from Gray-Level Histograms", IEEE Transactions on Systems, Man, and Cybernetics, vol. SMC-9, No. 1, Jan. 1979, pp. 62-66.

Tek, Faik B. et al., "Computer Vision for Microscopy Diagnosis of Malaria", Malaria Journal, BioMed Central 8(1), Jul. 13, 2009, 14 pp.

Tek, Faik B. et al., "Malaria Parasite Detection in Peripheral Blood Images", Proceedings of the British Machine Vision Conference 2006, Sep. 4, 2006, pp. 347-356.

World Health Organization, "Guidelines for the Treatment of Malaria", Second Edition, World Health Organization, 2010, 210 pp.

World Health Organization, ,"World Malaria Report 2009", World Health Organization, WHO Press 2009, 2009, 78 pp.

Zoueu, Jeremie T. et al., "Optical Microscope Based on Multispectral Imaging Applied to Plasmodium Diagnosis", Journal of Applied Sciences, Bd. 8, Nr. 15, Jan. 1, 2008, pp. 2711-2717.

* cited by examiner

DEVICE AND METHOD FOR DETERMINING OBJECTS IN A COLOR RECORDING

CROSS-REFERENCE TO RELATED APPLICATIONS

This application is a continuation of copending International Application No. PCT/EP2011/073583, filed Dec. 21, 2011, which is incorporated herein by reference in its entirety, and additionally claims priority from German Application No. DE 102010063965.6-53, filed Dec. 22, 2010, which is also incorporated herein by reference in its entirety.

BACKGROUND OF THE INVENTION

Embodiments of the present invention provide a device for determining objects in a color recording, as it may, for example, be used for determining plasmodia, for example in thick blood films. Further embodiments provide a method for determining objects in a color recording, as it may, for example, be used for determining plasmodia, for example in a thick blood film.

Malaria is a tropical disease caused by the infection of red blood cells (erythrocytes) with single-cell parasites of the species of *Plasmodium*. The disease is transmitted by female mosquitoes of the anopheles species from human to human. Four classes of plasmodia are relevant for human beings: *Plasmodium falciparum, Plasmodium vivax, Plasmodium ovale* and *Plasmodium malariae*. The most severe forms of malaria are caused by *Plasmodium falciparum*. The number of annual new infections is estimated by the World Health Organization (WHO) to be 300 to 500 million cases. Every year approximately 1 million people die of malaria. In 2008 approximately 243 million cases led to approximately 863, 000 deaths.

According to the World Health Organization (WHO), microscopic examinations of colored blood films are the "gold standard" for the diagnosis of malaria. Two types of blood films are used for diagnosing malaria: thin and thick ones. A thick blood film is used for the search for malaria parasites, as the same consists of many layers of blood cells and enables the examination of relatively large amounts of blood. Often, however, the types of parasite (e.g. *Plasmodium vivax*) may not be confirmed merely on the basis of a thick film. Thus, for characterizing the types of parasite detected in the thick blood film, conventionally a thin film is produced. According to the WHO, a routine examination of thick films is based on the examination of at least 100 microscopic visual fields with great magnification (objective×100, ocular×10). This method is long and tiring for a laboratory assistant and necessitates special training and extensive specialist knowledge. Apart from that, it seems to be error-prone, as studies have shown that in the resulting quantifications of a parasite density there is strong variability within and among observers. Thus, CADe systems (CADe=computer-aided detection) are necessitated which help laboratory assistants when detecting and counting plasmodia in thick blood films. In FIG. 13, exemplary plasmodia are illustrated cut out of images of thick blood films.

Despite great progress in the field of malaria diagnosis, light microscopy is still the most important technique for the diagnosis of this disease, see also [Guidelines for the Treatment of Malaria. Second Edition. World Health Organization 2010]. With this technology, using a light microscope, on the basis of thick and thin blood films plasmodia are detected and characterized in the blood.

In this respect, FIG. 8 shows a recording of a thin blood film 801 (at the top in FIG. 8) and a thick blood film 802 (at the bottom in FIG. 8). With the thin film a small amount of blood is spread across a large area. With the thick film a larger amount of blood is spread on a round area with a diameter of approximately 1 cm. The concentration of the blood with the thick film is approximately 20× higher than with the thin film, as may clearly be seen in FIG. 8 due to the stronger coloring of the thick blood film 802.

In early stages of the malaria disease the plasmodia in the blood may be present at extremely low concentrations. The microscopic search for plasmodia in blood films often corresponds to the proverbial needle in a haystack. For this reason the microscopic diagnosis of malaria is very time-consuming and causes comparatively high costs. Due to the low concentrations of plasmodia in the blood, the detection of plasmodia is performed according to the guidelines of the WHO on the basis of a thick blood film (as is exemplarily shown in FIG. 8 as a thick blood film 802). With a thick blood film, the erythrocytes are hemolyzed (dissolved) by water in the coloring solution. By enrichment or concentration, per visual field approximately 20 to 40 times more plasmodia exist in a thick blood film than in a thin blood film (as is exemplarily illustrated in FIG. 8 as a thin blood film 802).

Prototypes for computer-automated microscopy methods/systems exist (computer-automated microscopy CAM) which automate the search for plasmodia on the basis of a thin blood film. These systems/methods detect and segment first of all erythrocytes in digital recordings of the thin blood film and characterize the detected erythrocytes as "infected by plasmodia" or as "not infected by plasmodia". In the following, some documents are briefly to be mentioned which deal with the detection of plasmodia in blood films.

A rougher overview of currently used methods is disclosed in a conference article by Tek et al. [see also: F. B. Tek, A. G. Dempster, and I. Kale. Computer vision for microscopy diagnosis of malaria. Malaria Journal, 8(1): 153, 2009].

The detection of plasmodia on the basis of thick films is the recommended standard proposed by the WHO and is approximately ten times more sensitive than on the basis of thin films [see also: World Health Organization. World malaria report 2009. WHO Press, 2009].

Still, only one single article published by Frean [see also: J. Frean. Reliable enumeration of malaria parasites in thick blood films using digital image analysis. Malaria Journal, 8(1): 218, 2009] covers the automatic detection of plasmodia in thick films. Frean proposes a direct approach of detection on the basis of freely accessible software which is capable of estimating average to large parasite densities with high accuracy but is not suitable for smaller plasmodia densities (less than six parasites per image).

Diaz et al. [see also: G. Diaz, F. A. Gonzalez, and E. Romero. A semi-automatic method for quantification and classification of erythrocytes infected with malaria parasites in microscopic images. J. of Biomedical Informatics, 42(2): 296-307, 2009] proposed an approach for the quantification and classification of erythrocytes infected with *Plasmodium falciparum*. Their approach comprises a segmentation and a classification stage. In the segmentation stage erythrocytes are identified and segmented using a luminance correction, pixel classification and an inclusion tree illustration. In the classification stage infected erythrocytes are identified and different infection stages are characterized.

The documents WO 03/102210 A2 and US 2004/0241677 A1 describe a method for an automatic analysis of a biological sample using a light microscope. As a possibility of application the search for objects in cells is mentioned. As an example, in particular the search for plasmodia in erythrocytes is mentioned. This is an analysis technique for thin blood films, as no erythrocytes are preserved in thick blood films.

The document WO 2005/121863 A1 describes a method for the automatic diagnosis of malaria and other infection diseases (e.g.: tuberculosis, Chlamydia). The document describes a CAM system whose central idea represents image analysis methods on the basis of the so-called morphological granulometry. The general procedure for the detection of plasmodia is based on the characterization of erythrocytes as "infected by plasmodia" or "not infected by plasmodia". This is an analysis method for thin blood films.

The document [ROSS, N. E. C. J. PRITCHARD, D. L. RUBIN and A. G. DUSE: Automated image processing method for the diagnosis and classification of malaria on thin blood smears. Medical and Biological Engineering and Computing, 44(5):427-436, 2006] describes the CAM system disclosed in the above-mentioned document WO 2005/121863 A1.

The journal article [LE, M.-T., T. R. BRETSCHNEIDER, S. JUSS and P. R. PREISER: A novel semi-automatic imagine processing approach to determine *Plasmodium falciparum* parasitemia in Giemsa-stained thin blood smears. BMC Cell Biol., 9:15, 2008] describes a current study regarding the automatic detection of plasmodia in thin blood films. The described methods necessitate the possibility of locating erythrocytes and for this reason are, among others, not transferable to thick blood films. Their approach is based on an analysis of the common localization of detected erythrocytes and potential plasmodia. Although their work is based on thin films, which is particularly suitable for differentiating species, their work does not cover this aspect.

In the journal article [EDEN, M., J. E. GREEN and A. SUN: Feasibility of computer screening of blood films for the detection of malaria parasites. Bull World Health Organ, 48(2):211-218, 1973] a more simple method for characterizing erythrocytes with the aim of detecting plasmodia is described. Also this method is not transferable to thick blood films.

In the documents [DEMPASTER, A. G: and C. DI RUBERTO: Using granulometries in processing images of malarial blood. In: Proc. IEEE International Symposium on Circuits and Systems ISCAS 2001, Vol. 5, pp. 291-294, 6-9 May 2001]; [DI RUBERTO, C., A. DEMPSTER, S. KHAN and B. JARRA: Automatic thresholding of infected blood images using granulometry and regional extrema. In: Proc. 15th International Conference on Pattern Recognition, Vol. 3, pp. 441-444, 3-7 Sep. 2000]; [DI RUBERTO, C., A. DEMPSTER, S. KHAN and B. JARRA: Segmentation of blood images using morphological operators. In: Proc. 15th International Conference on Pattern Recognition, Vol. 3, pp. 397-400, 3-7 Sep. 2000]; [DI RUBERTO, C., A. DEMPSTER, S. KHAN and B. JARRA: Morphological Image Processing for Evaluating Malaria Disease. In: IWVF-4: Proceedings of the 4th International Workshop on Visual Form, pp. 739-748, London. UK, 2001. Springer Verlag]; and [DI RUBERTO, C., A. DEMPSTER, S. KHAN and B. JARRA: Analysis of infected blood cell images using morphological operators. Image and Vision Computing, 20(2):133-146, February 2002] a CAM method for the analysis of thin blood films and for the detection of plasmodia is described. Also this system or method is based on the analysis of erythrocytes and thus on thin blood films.

The document [HALIM, S., T. R. BRETSCHNEIDER, Y. LI, P. R. PREISER and C. KUSS: Estimating Malaria Parasitaemia from Blood Smear Images. IN: Proc. 9th International Conference on Control, Automation, Robotics and Vision ICARCV, 06, pp. 1-6, 5-8 Dec. 2006] describes a method for the analysis of erythrocytes with the aim of plasmodia detection.

The document [TEK, F. B., A. G. DEMPSTER and I. KALE: Malaria parasite detection in peripheral blood images. In British Machine Vision Conference 2006 (BMVC2006), pp. 347-356, 2006] describes a method for the analysis of thin blood films with the aim of plasmodia detection. In contrast to the above-mentioned methods, here a classification pixel-by-pixel for a direct detection of plasmodia is used. A Bayesian pixel classification is used to find plasmodia candidates in the first stage. A kNN classifier which is based on features regarding form, histogram and statistical moments is used in a second stage in order to reduce the number of false positive detections.

The above-mentioned methods have in common that they do not enable a reliable detection of plasmodia even at early stages of the mentioned malaria infection.

SUMMARY

According to an embodiment, a device for determining objects in a color recording may have an identifier which is implemented to identify connected regions whose size or shape corresponds to a predetermined condition from a plurality of connected regions corresponding to chromatin-comprising objects and existing in a binary image derived from the color recording based on a ratio of green components with respect to blue components in the color recording, based on a shape or a size of the connected regions; a feature extractor for extracting a feature set for each of the identified connected regions from the color recording; a classifier for classifying the identified connected regions into at least two disjunct groups based on the extracted feature sets for the identified connected regions; and wherein the objects to be determined are plasmodia and the color recording is a visual field of at least a part of a thick blood film.

According to another embodiment, a method for determining objects in a color recording may have the steps of identifying connected regions whose size or shape corresponds to a predetermined condition from a plurality of connected regions corresponding to chromatin-comprising objects and existing in a binary image derived from the color recording based on a ratio of green components with respect to blue components in the color recording, based on a shape or a size of the connected regions; extracting a feature set for each of the identified connected regions from the color recording; and classifying the identified connected regions into at least two disjunct groups based on the extracted feature sets for the identified connected regions; wherein the color recording detects at least a partial area of a thick blood film and wherein the objects to be determined are plasmodia existing in the thick blood film.

According to another embodiment, a method for determining plasmodia in a thick blood film may have the steps of generating a thick blood film on an object carrier; localization of the thick blood film on the object carrier; making a plurality of color recordings of the thick blood film, wherein each of the color recordings detects at least a partial area of the thick blood film; and determining the plasmodia present in every color recording using the method according to claim 14 for each color recording.

According to another embodiment, a computer program may have a program code for executing one of the above-mentioned methods, when the program is executed on a computer.

Embodiments of the present invention provide a device for determining objects in a color recording. The device includes an identifier, a feature extractor and a classifier. The identifier is implemented to identify those connected regions from a plurality of connected regions present in a binary image derived from the color recording based on a size an/or a shape of the connected regions whose size and/or shape correspond to a predetermined condition. The feature extractor is implemented to extract a set of features for each of the identified connected regions from the color recording. The classifier is implemented to classify the identified connected regions into at least two disjunct groups based on the extracted set of features for the identified connected regions.

It is one idea of the present invention that an improved determination of objects in a recording may be acquired when connected regions which are parts of the object to be determined are identified based on their size and/or shape in a binary image and when for a subsequent classification of these identified connected regions sets of features of these identified connected regions are extracted from the color recording in which the object to be determined exists. In other words it is an idea of embodiments of the present invention to directly detect and classify the objects to be determined. For example, in the application of the device for determining plasmodia in a color recording of a thick blood film the identified connected regions may form parts of plasmodia.

Embodiments of the present invention, in contrast to the above-mentioned methods for the detection of plasmodia in thin blood films, enable a direct detection of the plasmodia and a direct classification of the plasmodia without a detection of the erythrocytes.

The device may, for example, be a CAM system which may, for example, comprise an automatic microscope, an automatic XY platform, a digital camera, an illumination system, a computer and a monitor.

Further embodiments of the present invention provide a method for the determination of objects in a color recording. The method comprises a step of identifying those connected regions from a plurality of connected regions existing in a binary image derived from the color recording based on a size and/or shape of the connected region whose size and/or shape correspond to a predetermined condition. Further, the method comprises a step of extracting a set of features for each of the identified connected regions from the color recording. Further, the method comprises a step of classifying the identified connected regions into at least two disjunct groups based on the extracted sets of features for the identified connected regions.

Also the method may be used for determining plasmodia in a color recording of a thick blood film, just like the above-mentioned device.

In other words, embodiments of the present invention provide a CAM system (or a CAM device) and a CAM method for the automatic detection of plasmodia, for example on the basis of a fully automatic microscope. The above-mentioned documents almost exclusively describe systems and methods for the detection of plasmodia in thin blood films. As the concentration of plasmodia at the early stage of a malaria infection is very low, the detection of plasmodia in this case is not possible in a thin blood film. Embodiments of the present invention enable a detection of plasmodia in thick blood films. In other words, in embodiments of the present invention, a direct detection of plasmodia may be carried out in thick blood films. This difference with respect to the above-mentioned documents not only allows the diagnosis of the disease at an early stage, but may necessitate approaches for plasmodia detection completely deviating from the known solution approaches. Methods as are described in the introductory part of this application first of all detect and segment red blood cells (the erythrocytes) in order to subsequently characterize the same as infected by plasmodia or not infected by plasmodia. It was found that this procedure is not possible with thick blood films as, due to the special coloring and preparation technique for thick blood films, the cell membranes of the red blood corpuscles are dissolved and can thus not be differentiated from each other and from the background. The methods mentioned in the introductory part of this application for the detection of plasmodia in the thin blood film can thus not be applied for thick blood films and can thus not serve for a reliable detection of malaria at an early stage. It was further found that a detection of plasmodia in thick blood films may be done when the same can be directly detected and characterized independent of their position in the erythrocytes. For this reason, with CAM systems and CAM methods according to embodiments of the present invention, plasmodia can be directly detected and characterized. Embodiments of the present invention thus represent an approach for solving the problem of the automatic diagnosis of malaria on the basis of thick blood films and, more specifically, for the automatic detection of plasmodia in thick blood films. Embodiments of the present invention thus enable a computer-assisted diagnosis of malaria already at an early stage in contrast to methods mentioned in the introductory part of this application.

Selected embodiments provide a new approach for the automatic detection of malaria parasites in thick blood films. Selected embodiments concentrate on the detection of *Plasmodium falciparum* parasites as this species is responsible for approximately 80% of all malaria cases and approximately 90% of all deaths caused by malaria. Three growth stages of plasmodia may be found in peripheral blood: trophozoites, schizonts and gametocytes. Infections with *Plasmodium falciparum* are special, however, as schizonts are usually not to be seen in peripheral blood and gametocytes only rarely. Thus, the selected embodiments mainly concentrate on the detection of trophozoites. The present approach deals with the problem of an exact detection independent of a plasmodia density.

BRIEF DESCRIPTION OF THE DRAWINGS

In the following, embodiments of the present invention are explained in more detail with reference to the accompanying drawings, in which:

FIG. 5b is an image of an enlarged partial area of a thin blood film as a comparative example with respect to FIG. 5a;

DETAILED DESCRIPTION OF THE INVENTION

Figure 1A:
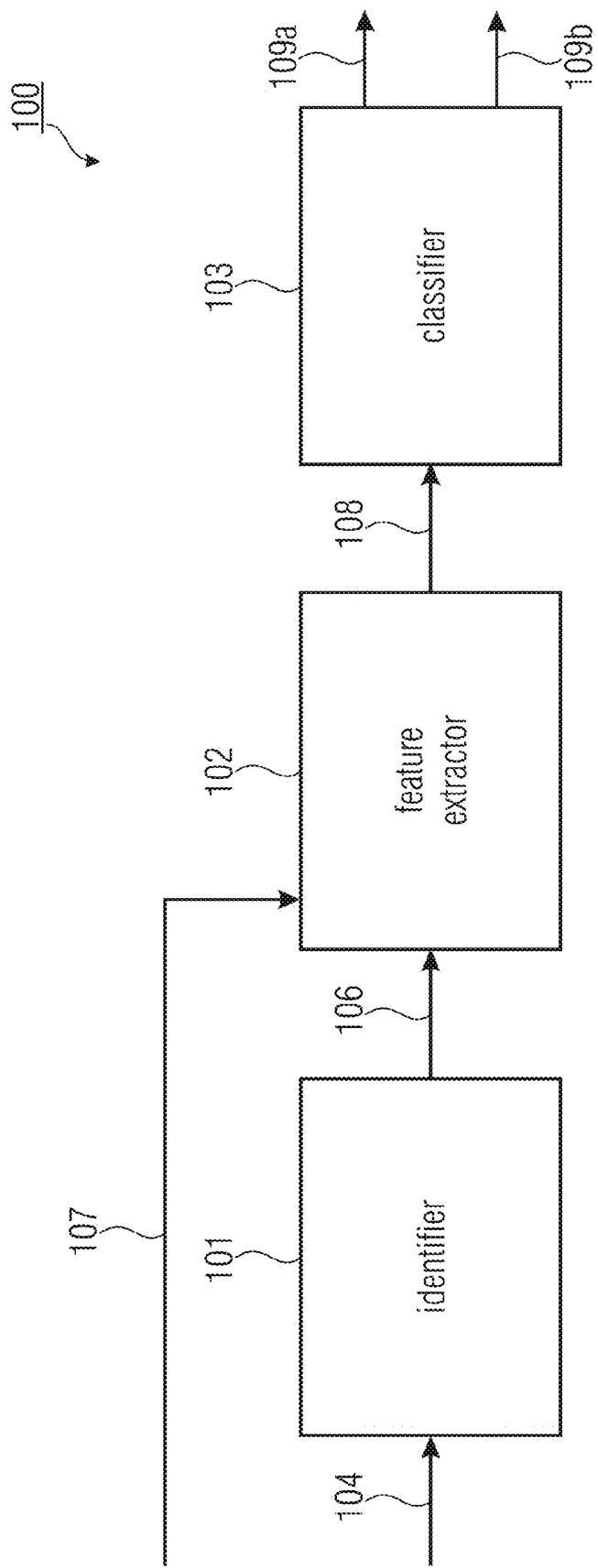
FIG. 1a is a block diagram of a device according to one embodiment of the present invention.

Before embodiments of the present invention are described in the following in more detail with reference to the accompanying drawings, it is to be noted that like elements and/or elements with the same function are provided with the same reference numerals and that a repeated description of those elements is omitted. Descriptions of elements with the same reference numerals are thus mutually interchangeable.

FIG. 1a shows a block diagram of a device 100 for determining objects in a color recording 107. The device 100 comprises an identifier 101, a feature extractor 102 and a classifier 103. The identifier 101 is implemented to identify those connected regions whose size and/or shape correspond to a predetermined condition from a plurality of connected regions (also referred to as regions of interest (ROIs)) based on a size and/or shape of the connected regions. The connected regions here are present in a binary image 104. The binary image 104 comprises a plurality of picture elements or pixels wherein each picture elements either comprises the binary value of a logical "1" or logical "0". A connected region may, for example, comprise a plurality of picture elements of the same binary value which are directly connected to each other or via picture elements of the same binary value. The binary image 104 may, for example, comprise a plurality of connected regions with the same binary value, for example in the form of islands of the binary image 104. The islands of the binary image 104 may, for example, form a foreground of the binary image 104. Further, the binary image 104 may comprise a connected region of a binary value complementary to the binary value of the islands which forms a background of the recording and encloses the individual islands. It is assumed in the following that the connected regions which form the foreground have the binary value of a logical "1". The predetermined condition may, for example, predetermine a maximum size and/or a certain form of these islands, so that only islands are identified whose size or shape corresponds to the predetermined condition. An output of the identifier 101 may be a reduced binary image 106 which contains the identified connected regions and wherein the non-identified connected regions are filtered out of the binary image 104 by the identifier 101. It is also possible that no connected region existing in the binary image 104 corresponds to the predetermined condition, so that the reduced binary image 106 contains no identified connected regions. In this case, the reduced binary image 106 may, for example, only consist of the background, i.e. for example a connected region with the logical binary value "0".

The feature extractor 102 is implemented to extract a set of features from the color recording 107 for each of the identified connected regions. The color recording 107 may in this respect be provided to the feature extractor 102. The identified connected regions may, for example, be present in the reduced binary image 106 provided by the identifier 101.

According to some embodiments a set of features of an identified connected region may, for example, contain information about their momentary features, shape features, texture features and/or color features. The feature extractor 102 may, for example, extract the sets of features of the identified connected regions from sections of the color recording 107 which surround the respective identified connected regions or in which the identified connected regions lie. According to some embodiments the feature space may, for example, have 174 dimensions which may necessitate a selection of a partial set of features in order to avoid the curse of dimensionality. Further, all features are standardized so that they have an average value of 0 and a standard deviation of 1.

An optimum partial set of features which is extracted by the feature extractor 102 from the identified connected regions will then be selected in a two-stage training method. In this respect, with the help of a feature selector, in a first step the 174 features may be evaluated based on a training data set and the 60 best features may be selected. From these 60 features in a second step by means of a genetic algorithm a small part of features may be selected which is extracted by the feature extractor 102 from the identified connected regions as a partial set of features. In other words, the feature selector is implemented to reduce the set of features to a partial set of features which describes the features from the complete feature space extracted by the feature extractor 102 from the connected identified regions. Before the feature extractor 102 is used for the extraction of the feature sets from the identified connected regions of the color recording 107 it may be set such that it extracts only a certain subset of possible features (the partial set of features) from the identified connected regions.

As the binary image 104 and thus also the reduced image 106 are based on the color recording 107, positions of the identified connected regions in the reduced binary image 106 may be identical to the positions of these identified connected regions in the color recording 107. The feature extractor 102 may thus, for example, select the identified connected regions as centers for the respective sections from which the feature extractor 102 may extract the set of features. In other words, sections may each be centered to the connected region which lies within the same. In this respect, the feature extractor 102 may, for example, determine main points for the identified connected regions in the reduced binary image 106 and select these main points as main points for the respective sections in which the identified connected regions lie.

The size of the sections may be selected by the feature extractor 102 for example independent of a shape or size of the identified connected regions belonging to the section, but at least to be so large that the section completely detects the associated identified connected region. Further, a size and/or shape of the sections may be the same with all sections. Thus, the size and/or shape of these sections may, for example, be selected depending on a maximum size and/or shape of the objects to be determined. For example, a size of the sections may be selected such that the same may still detect a largest possible object to be determined. It is typically already clear in advance what type the objects to be determined (i.e. searched for) are. These different types (for example thrombocytes, leukocytes, plasmodia, etc.) of objects occur in nature typically with different maximum possible sizes. The size of the sections may thus be selected depending on the type of the objects to be determined, so that a largest possible object of this type completely fits into the section in which the largest possible object lies. For example, the area of the sections may be selected such that it at least corresponds to a largest possible area of the objects to be determined, wherein the largest possible area of the objects to be determined is determined by the predetermined condition.

Further, the sections may, for example, comprise a square, round, oval or any other shape. According to one embodiment, a shape of the sections may, for example, be square, for example 80×80 picture elements.

An output of the feature extractor 102 is a set 108 of sets of features for the identified connected regions. As described above, according to further embodiments, these sets of features may only comprise the features reduced in the training phase of the feature extractor 102.

The classifier 103 is implemented to classify the identified connected regions into at least 2 disjunct groups based on the extracted sets of features for the identified connected regions. The classifier 103 may, for example, classify the identified connected regions into a first group 109a and a second group 109b. The first group 109a may here, for example, comprise correct-positively identified connected regions. The second group 109b may here comprise false-positively identified connected regions. Correct-positively identified connected regions are here the identified connected regions which were identified based on their sets of features as objects to be determined in the color recording 107. False-positively identified connected regions which are associated with the second group 109b are here identified connected regions which were identified on the basis of their size and/or shape by the identifier 101 in the binary image 104 but which were not classified as objects to be determined by the classifier 103 due to their sets of features.

In other words, the objects to be determined are present in the first group 109a as correct-positively identified connected regions. The identified connected regions present in the second group 109b correspond to the predetermined condition for objects to be determined due to their size and/or shape in the binary image 104 but may not be considered as objects to be determined due to their sets of features which were extracted from the color recording 107.

In addition to the reduction of the set of features for the feature extractor 102, in the training method also the classifier 103 may be trained based on the training data set and the reduced partial set of features (once before the same is used for the classification of the identified connected regions of the color recording 107 in order to acquire an optimized classification result in the classification of the identified connected regions of the color recording 107. The classifier may then execute the classification of the identified connected regions of the color recording 107 only based on the features reduced in the training method. According to further embodiments (for example in a small feature space), the above-described step of feature selection may also be omitted so that the classifier 103 is trained based on the complete feature space and the classification of the identified connected regions of the color recording 107 is executed on the complete feature space. The step of feature selection is thus a step which is not necessary. From a certain dimensionality onwards (for example with the above-described size of the feature space with 174 features) it is advantageous, however, on the one hand to reduce the number of features to be extracted (acceleration of the complete detection method) and on the other hand to prevent the curse of dimensionality.

An output of the device 100 may here be the first group 109a with the correct-positively identified connected regions. A correct-positively identified connected region thus in each case forms an object to be determined in the color recording 107 or is at least part of an object to be determined in the color recording 107.

The output of the device 100 and thus the determined objects may, for example, be presented to a user so that the user may still execute a manual check of the determined objects. Further, as a second output of the device 100 also the second group 109b of the false-positively identified connected regions may be indicated, for example to acquire a still greater security when determining the objects if one of the identified connected regions has been wrongly classified as false-positive.

According to some embodiments, the classifier 103 may compare the extracted sets of features for the identified connected regions to reference sets of features (received from a training phase) to allocate each identified connected region to exactly one of the disjunct groups 109a, 109b as a result of the comparison. The reference sets of features may, for example, be taught to the classifier 103 in advance by hand, for example on the basis of a database or already previously (manually) determined objects. According to further embodiments, also the objects present as correct-positively identified connected regions in the first group 109a may be included into the database in order to thus increase the reference set of features.

As already mentioned, the feature extractor 102 may be implemented such that the extracted sets of features comprise at least shape features, texture features and/or color features of the associated identified connected regions. The classifier 103 may thus be implemented to classify the identified connected regions into the disjunct groups 109a, 109b based on at least one of those features contained in the sets of features.

The binary image 104 together with the color recording 107 forms an input for the device 100.

According to some embodiments, the color recording 107 may, for example, be a recording of a partial area of a thick blood film. The objects to be determined may, for example, be the above-mentioned plasmodia in the thick blood film. According to the guidelines of the Word Health Organization, for a reliable detection of plasmodia in a thick blood film at least 100 visual fields of the thick blood film are to be created and the existing plasmodia within the same are to be detected. The color recording 107 may here, for example, represent one of the visual fields. In other words, the device 100 may determine the plasmodia existing in the visual field of the thick blood film for each of the visual fields. The plasmodia existing in this visual field are output as the correct-positively identified connected regions in the first group 109a of the device 100.

The binary image 104 may already have been derived by an external device from the color recording 107 and have been provided to the device 100, according to further embodiments, however, also an additional means of the device 100 may derive the binary image 104 from the color recording 107. Further, the color recording 107 may also be provided to the device 100, for example in a digitized form. Further, also the color recording 107 may be recorded by a further means of the device 100.

Figure 1B:
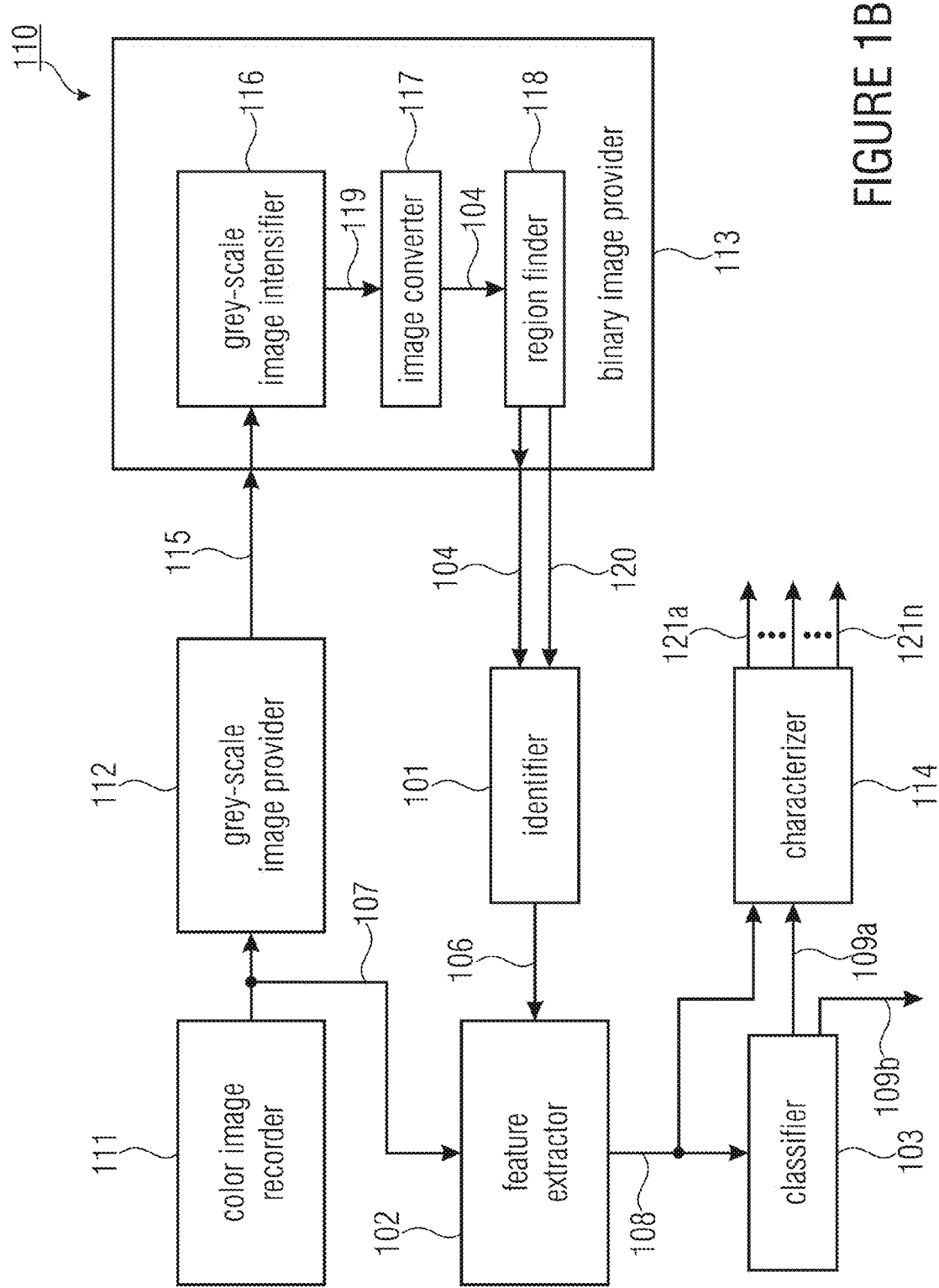
FIG. 1b is a block diagram of a device according to a further embodiment of the present invention.

FIG. 1b shows a device 110 for determining objects in a color recording. The device 110 in its basic function may here, for example, correspond to the device 100 illustrated in FIG. 1a, wherein in FIG. 1b further optional details are illustrated. The device 110 comprises a color image recorder 111, a grayscale image provider 112, a binary image provider 113, an identifier 101, a feature extractor 102, a classifier 103 and a characterizer 114. The identifier 101, the feature extractor 102 and the classifier 103 may correspond basically to the identifier 101, the feature extractor 102 and the classifier 103 of the device 100 with respect to their function.

Thus, the functions of these three means are not to be explained again in detail but only the functions of the additional optional means, i.e. the color image recorder 111, the grayscale image provider 112, the binary image provider 113 and the characterizer 114, are to be explained in detail.

The color image recorder 111 serves for recording the color recording 107 in order to provide the same to the grayscale image provider 112. The color image recorder 111 may, for example, be a scanner which digitizes an analog image to provide the same as a color recording 107. Further, the color image recorder 111 may also comprise a camera which makes a photo of a sample in which objects to be determined exist and which provide the same as the color recording 107. In one embodiment the sample may exist on a carrier or plate and the color image recorder 111 may be implemented to localize the position of the sample on the carrier. This may, for example, be executed by recording a photo of the sample in a low enlargement or magnification and the application of a simple threshold value method. After the localization of the sample the color image recorder 111 may, for example, generate a plurality of color image recordings 107 as a plurality of visual fields of the sample, for example in high magnification. In other words, the color image recorder 111 may record a plurality of color recordings 107, for example a plurality of overlapping color recordings 107 and the device 110 may determine relevant objects existing in the respective color recordings 107 individually for each color recording 107 of the plurality of color recordings 107. The grayscale image provider 112 is implemented to provide a grayscale image 115 based on the color recording 107. The color recording 107 may, for example, be an RGB color recording. Providing the grayscale image may, for example, be executed based on characteristic ratios of values in the different color channels of the RGB color recordings. According to some embodiments, the grayscale image 115 may be generated based on the green and blue channels of the color recording 107. For example, the color recording 107 may be transformed into the grayscale image 115 by the grayscale image provider 112 using the equation (1):

$$I_{gb}(x, y) = \arctan\left(\frac{I_{green}(x, y)}{I_{blue}(x, y)}\right) \quad (1)$$

$I_{green}$ and $I_{blue}$ here are the green and blue channels of the color recording 107. (x,y) here describe coordinate positions of an image element of the color recording 107. $I_{gb}$ is the grayscale image 115.

The binary image provider 113 is implemented to provide a binary image 104 based on the grayscale image 115 of the color recording 107 so that the connected regions in the binary image 104 form a foreground of the binary image 104. In other words, the binary image provider 113 is implemented to transfer the grayscale image 115 into an image with a plurality of connected regions, wherein image elements of the connected regions which form the foreground of the binary image 104 all comprise the same binary value. In other words, the binary image provider 113 is provided to generate the grayscale image 115 by a color-to-grey-stage imaging of the color recording 107 and to generate the binary image 104 from the grayscale image 115.

As may be gathered from FIG. 1b, the binary image provider 113 may comprise a grayscale image intensifier 116, an image converter 117 and a region finder 118.

The grayscale image intensifier 116 is implemented to subject the grayscale image 115 to filtering to acquire an intensified grayscale image 119 as a result of filtering. The intensified or amplified grayscale image 119 may also be referred to as a filtered grayscale image 119. The grayscale image intensifier 116 may execute the filtering such that a contrast between areas of the color recording 107 in which objects to be determined lie and areas of the color recording 107 in which objects to be determined do not lie is intensified in the intensified grayscale image 119 with respect to the grayscale image 115. In other words, the grayscale image intensifier 116 may intensify differences between objects to be determined in the color recording 107 and objects not to be determined by applying filtering to the grayscale image 115. By intensifying, following stages be able to differentiate better between areas of the color recording 107 in which the objects lie and areas of the color recording 107 in which the objects do not lie.

The image converter 117 is implemented to determine a threshold value based on the intensified grayscale image 119 to provide the binary image 104 based on the determined threshold value in connection with the intensified grayscale image 119. The image converter 117 may here for example apply a (one-stage) Otsu method to the intensified grayscale image 119 or another bimodal threshold value method to acquire the binary image 104. As already described above, the binary image 104 then only comprises image elements which either comprise a first logical binary value or a second logical binary value. As already described, the image elements of the connected regions identified by the identifier 101 all comprise the same logical binary value. These image elements typically form the foreground of the binary image 104, while the remaining image elements together with the other logical binary value form the background of the binary image 104. The identifier 101 may receive the binary image 104 provided by the image converter 117 to identify connected regions in this binary image whose size and/or shape corresponds to a predetermined condition. As the connected regions in the binary image 104 are typically present as a plurality of image points, the identifier 101 may group neighboring image elements of the same binary value or image elements connected via image elements of the same binary value into the connected groups in order to then identify the same based on their shape and/or size.

According to further embodiments, as is illustrated, for example, in the device 110 in FIG. 1b, the binary image provider 113 may also comprise the region finder 118 which, in the binary image 104, combines adjacent image points of the same binary value and image points of the same binary value connected via image points of the same binary value each into a connected region, so that image elements of the plurality of connected regions which form the foreground of the binary image 104 comprise the same binary value in the binary image 104. The region finder 118 may in this respect provide, for example, the binary image 104 in connection with meta data 120 to the identifier 101 wherein the data indicates which image elements existing in the binary image 104 belong to which connected region. The region finder 118 may here, for example, execute a so-called "connected component labeling algorithm" to group connected image elements of the same binary value into connected regions. The term "connected component labeling" here stands for naming connected components.

In summary, the binary image provider 113 may be implemented, when generating the binary image 104 from the grayscale image 115 to subject the grayscale image 115 to high-pass filtering in order to acquire the filtered grayscale image 119 as a result of filtering, determine a threshold value from the filtered grayscale image 119 and generate the binary image 104 based on the determined threshold value from the intensified grayscale image 119. Further, the binary image provider 113 may be implemented to classify the portion in the binary image 104 in which the binary image 104 comprises a binary value into separated but connected regions which represent the plurality of connected regions among which the identification is executed.

As already mentioned, based on the binary image 104 in connection with the metadata 120, the identifier 101 may identify the connected homogenous regions whose size and/or shape correspond to a predetermined condition. The identifier 101 thus reduces the binary image 104 to acquire the reduced binary image 106. By identifying the connected regions in the binary image 104 on the basis of their size and/or shape, it may be enabled that (virtually) no objects to be determined are missed, but possibly other image parts may erroneously be detected as objects to be determined. I.e., the reduced binary image 106 may comprise identified connected regions which are not objects to be determined or not part of the objects to be determined.

The feature extractor 102 may thus extract sets of features for the identified connected regions which are present in the reduced binary image 106 from the color recording 107. As already mentioned, the feature extractor 102 provides a set 108 of sets of features on the identified connected regions. Based on the sets 108 of the sets of features of the identified connected regions in the color recording 107, the classifier 103 classifies the identified connected regions into a first disjunct group 109a and a second disjunct group 109b. As already mentioned, based on the sets of features the classifier 103 may classify correct-positively identified connected regions into the first disjunct group 109a and false-positively identified connected regions into the second disjunct group 109b. In other words, the classifier 103 may classify the identified connected regions into the disjunct groups such that the identified connected regions associated with the first disjunct group 109a form objects to be determined or at least part of these objects to be determined existing in the color recording 107.

Figure 9:
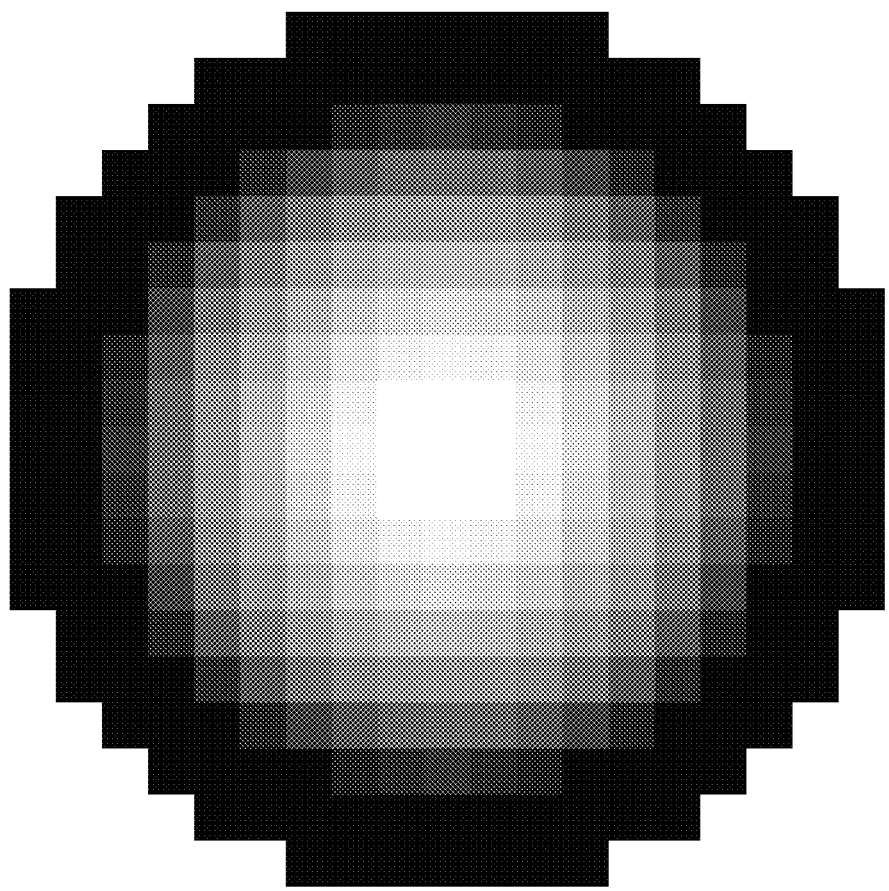
FIG. 9 is an illustration of a non-planar structuring element representing a paraboloid.

According to some embodiments, the grayscale image intensifier 116 of the binary image provider 113 may be implemented to subject the grayscale image 115 to a so-called "black top hat" filtering. A maximum area of a used "black top hat" structural element may here be selected such that the same corresponds to at least an area of a largest possible object to be determined. For example, a circular "black top hat" structural element may be selected whose diameter corresponds to a maximum possible diameter of an object to be determined. Such an exemplary structural element is illustrated in FIG. 9. This selection of the area of the structural element may be executed analog to the selection of the sections for feature extraction as may be executed in the following by the feature extractor 102, and thus be selected depending on the type of the objects to be determined, so that the area of the structural element corresponds at least to an area of a largest possible object of this type. For example, the area of the structural element may be selected such that it corresponds at least to a largest possible area of the objects to be determined, wherein the largest possible area of the objects to be determined is determined by the predetermined condition.

The grayscale image intensifier 116 may here be implemented such that with this "black top hat" filtering a copy of the grayscale image 115 morphologically closed with the above-mentioned "black top hat" structural element is deducted from the grayscale image 115 in this "black top hat" filtering.

As can be seen from FIG. 1b, the device 110 may further comprise a characterizer 114 which is implemented to characterize all identified connected regions classified into the first disjunct group 109a into a plurality of disjunct characterization groups 121a to 121n based on the extracted sets of features for the identified connected regions. In other words, the device 110 may not only be implemented to find objects existing in the color recording 107 but also to determine the type of the same. The characterizer 114 may here, for example, be implemented to execute this characterization based on a specially trained reference database on the basis of shape or form features, texture features and/or color features.

According to further embodiments, the device 110 may also include a display, for example a monitor, which displays the determined objects. For example, the first disjunct group 109a may be displayed. Further, also the different characterization groups 121a to 121n may be displayed.

According to some embodiments, the objects to be determined may be plasmodia. In this respect, the color recording 107 may, for example, be a color recording of a visual field of a thick blood film. The first disjunct group 109a may here, for example, describe the correct-positively detected plasmodia existing in the color recording 107. The different characterization groups 121a to 121n may, apart from that, indicate which type the respective correct-positively detected *plasmodium* is. Thus, a characterization into *Plasmodium falciparum, Plasmodium vivax, Plasmodium ovale* and *Plasmodium malariae* may be carried out, wherein one characterization group of the characterization groups 121a to 121n exactly corresponds to one of these mentioned types.

Figure 2:
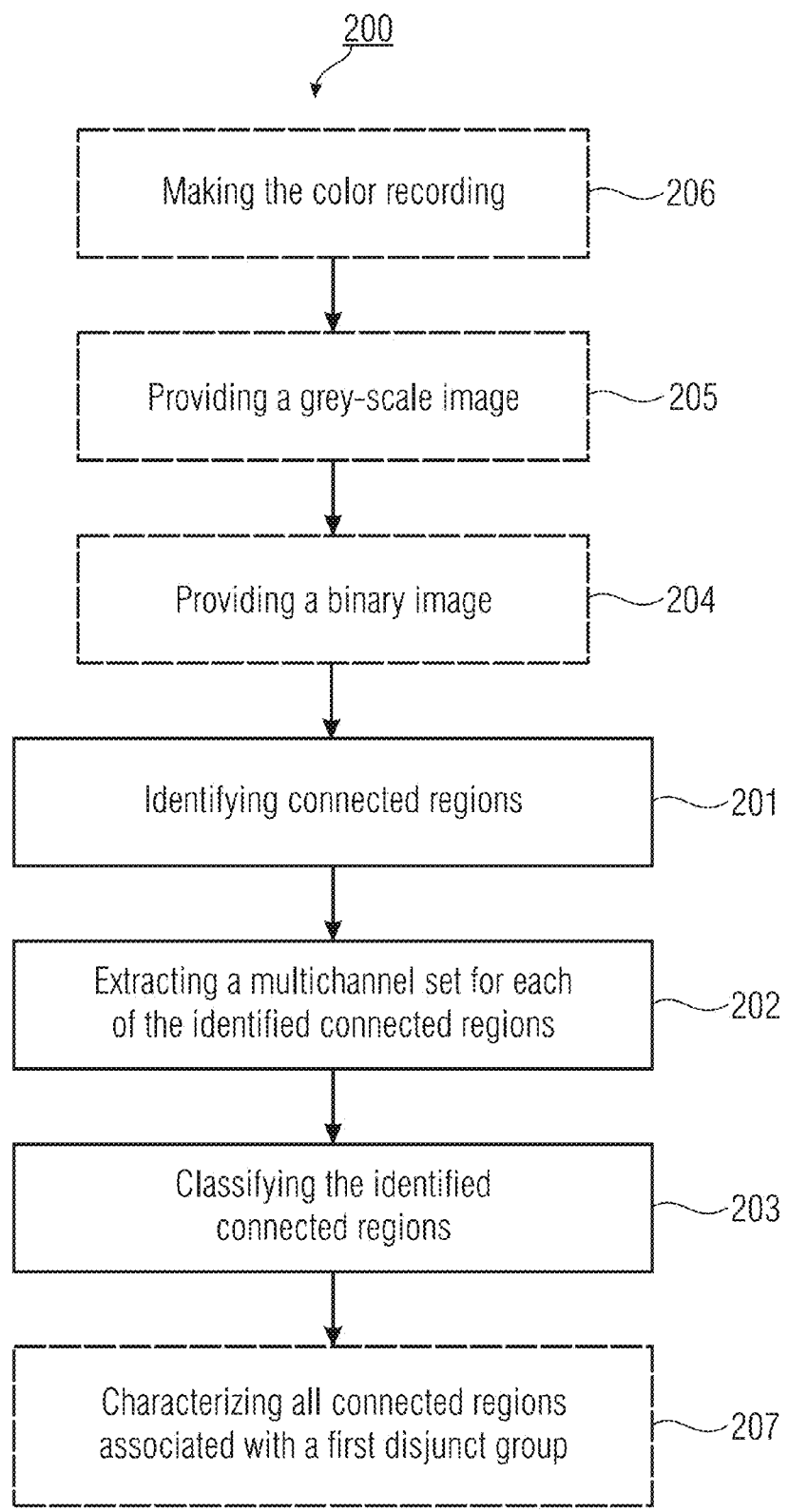
FIG. 2 is a flowchart of a method according to one embodiment of the present invention.

FIG. 2 shows a flowchart of a method 200 for determining objects in a color recording.

The method 200 comprises a step 201 of identifying those connected regions, whose size and/or shape corresponds to a predetermined condition, from a plurality of connected regions existing in a binary image derived from the color recording based on a size and/or shape of the connected regions.

Further, the method 200 comprises a step 202 of extracting a feature set of each of the identified connected regions from the color recording.

Further, the method 200 comprises a step 203 of classifying the identified connected regions into at least two disjunct groups based on the extracted feature sets for the identified connected regions.

The method 100 may, for example, be executed by the device 100 according to FIG. 1a or the device 110 according to FIG. 1b. Thus, the step 201 of identifying may, for example, be executed by the identifier 101 of the devices 100, 110. The step 202 of extracting may, for example, be executed by the feature extractor 102 of the devices 100, 110. The step 203 of classifying may, for example, be executed by the classifier 103 of the devices 100, 110.

According to some embodiments, in the step 202 of extracting the feature sets, the sets of features of the identified connected regions of sections of the color recording which surround the respective identified connected regions and are centered with respect to the same may be extracted. A size and/or a shape of the sections may here be the same for all identified connected regions. This size and/or shape of the sections may here depend on the type of the object to be determined, for example for typically circular objects circular sections may be used and, for example, a size of the sections may be selected such that the sections are at least as large as a largest possible object to be determined.

According to further embodiments, in step 203 of classifying the identified connected regions, the extracted feature sets may be compared to reference feature sets to allocate each identified connected region to exactly one of the disjunct groups as a result of comparison. These reference feature sets may, for example, be generated by training a reference database. The database may, for example, be set up such that a user designates sections of a color recording as an object or non-object by hand. Before the step of classifying 203 the identified connected regions the method 200 may thus further comprise a step of generating the reference feature sets.

According to further embodiments, as illustrated in FIG. 2, the method 200 may comprise a step 204 of providing the binary image based on a grayscale image of the color recording before the step 201 of identifying the connected regions. In step 204 of providing the binary image, the grayscale image may be subjected to filtering such that a contrast between areas of the color recording in which objects to be determined lie and areas of the color recording in which objects to be determined do not lie is intensified in order to acquire an intensified grayscale image as a result of filtering. Further, in step 204 of providing the binary image, the intensified grayscale image may be transformed into the binary image using a threshold value method. Further, in step 204 of providing the binary image, image elements existing in the binary image may be grouped into the plurality of connected regions. This step may, for example, be executed by the region finder 118 according to FIG. 1b. The step 204 of providing the binary image may generally also be executed by the binary image provider 113 according to FIG. 1b.

Further, before the step 204 of providing the binary image, the method 200 may comprise a step 205 of providing the grayscale image. In this step 205 of providing the grayscale image, the color recording may be transformed into the grayscale image based on at least two of its color channels. This step 205 of providing the grayscale image may, for example, be executed by the grayscale image provider 112 according to FIG. 1b.

Further, the method 200 may comprise a step 206 of generating the color recording. The step of generating the color recording may, for example, be executed by the color image recorder 111 according to FIG. 1b. In this step 206 of generating the color recording, for example an image may be scanned and be provided in digital form as the color recording or, for example using a camera, a photo may be made and the same may be digitally, provided as a color recording.

After the step 203 of classifying the identified connected regions, the method 200 may further comprise a step 207 of characterizing all identified connected regions associated with a first of the two disjunct groups into a plurality of disjunct characterization groups based on the extracted feature sets for the identified connected regions. This step 207 of characterizing may, for example, be executed by the characterizes 114 according to FIG. 1b.

The steps of the method 200 represented as dashed lines in the flowchart of FIG. 2 may represent optional steps of the method 200. I.e., according to some embodiments, the color recording may already exist and is not generated in a step of the method 200. Further, also the grayscale image (also referred to as gray level image) may already exist and is not provided in a step of the method 200. Further, also the binary image with the connected regions may already exist and is not provided in a step of the method 200. According to further embodiments, also a characterization of connected regions associated with the first disjunct group may be omitted, for example if only a number of objects existing in the color recording is requested but not their type. The steps of the method 200 illustrated in FIG. 2 in dashed lines thus only represent optional extensions of the method 200 which extend a functionality of the method 200.

Just like the device 110 according to FIG. 1b, also the method 200 may be used for determining plasmodia in a color recording. The color recording may here, for example, detect at least a partial area of a thick blood film in which the plasmodia to be determined exist. Or in other words, the color recording may form a visual field of the thick blood film. The method 200 may thus be executed for each recorded visual field of the thick blood film in order to be able to determine all plasmodia existing in the thick blood film. According to further embodiments, for each visual field of the blood film at least three color recordings of this visual field may be generated, for example in three different focal planes, wherein the method 200 may be executed for any color recording of any focal plane.

Further embodiments of the present invention describe a method for determining plasmodia in a thick blood film. This method may comprise a step of generating a thick blood film on an object carrier.

Further, this method may comprise a step of localizing the thick blood film on the carrier. This step of localization may, for example, be executed by generating a recording of the carrier and by a subsequent threshold value method with respect to this recording.

Further, this method may comprise a step of generating a plurality of color recordings of the thick blood film. Each of these color recordings thus detects at least a partial area of the thick flood film. These color recordings may, for example, partially overlap.

Further, this method may comprise a step of determining plasmodia existing in each color recording using the method 200 for each color recording. The objects to be determined of the method 200 are here plasmodia existing in the respective color recording.

As already described, in the step of generating the plurality of color recordings for each partial area of the thick blood film detected by a color recording, several (for example three) color recordings may be generated which detect the same partial area but comprise different focal planes. The method 200 may thus be executed three times or according to the number of the focal planes for each partial area of the thick blood film. Also with a high enlargement, this enables a secure detection of the plasmodia existing in this partial area.

According to further embodiments, this method may further comprise, after the step of determining the plasmodia existing in every color recording, a step of generating a thin blood film and determining the plasmodia existing in the thin blood film.

Embodiments of the present invention thus provide a method which may give a reliable statement whether plasmodia exist in the blood and thus enable a reliable automatic detection of malaria based on the determination of plasmodia in a thick blood film and the subsequent determination of plasmodia in a thin blood film.

Figure 3:
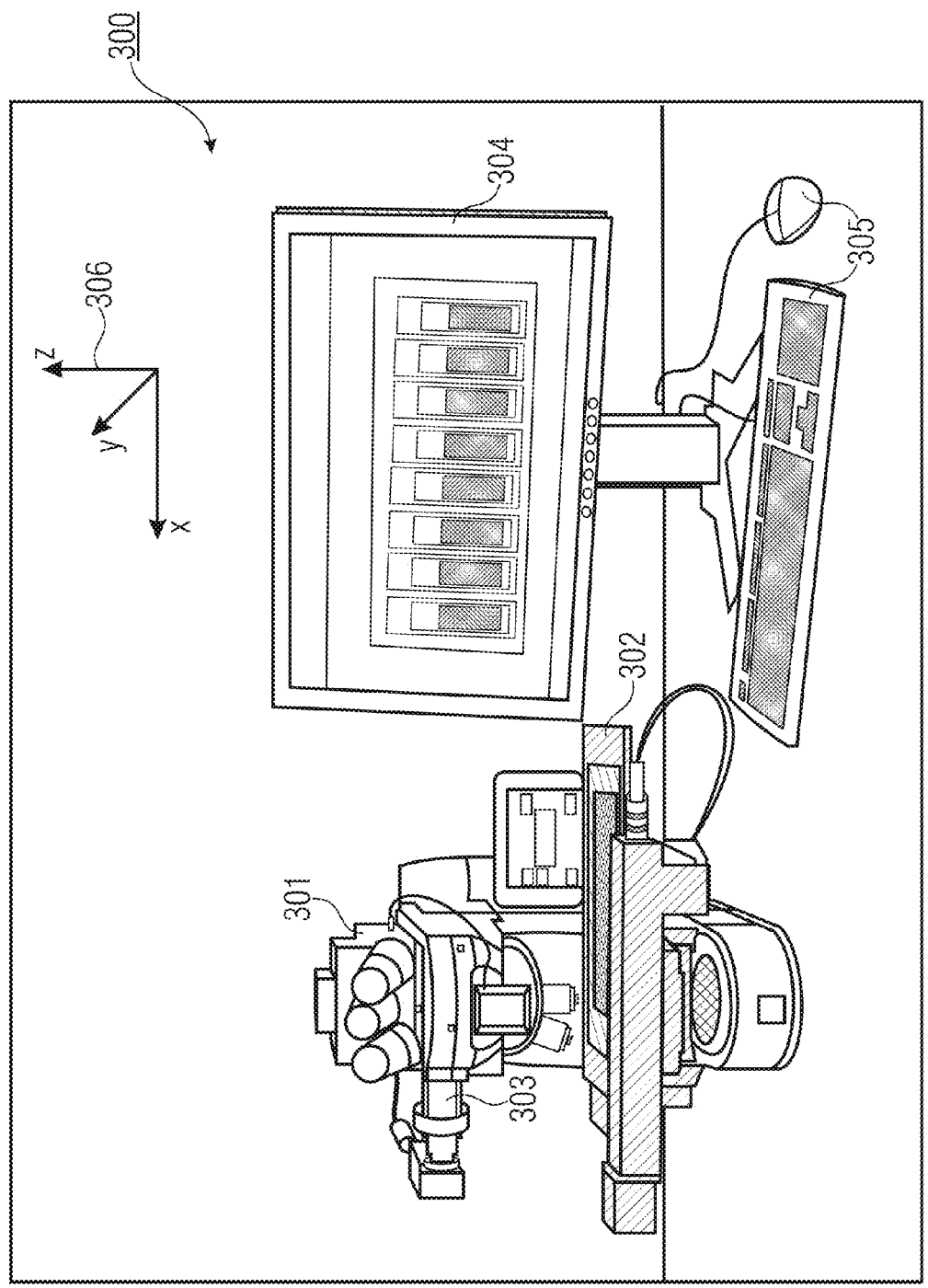
FIG. 3 is an illustration of a device according to a further embodiment of the present invention.

FIG. 3 shows an image of a CAM system 300 according to one embodiment of the present invention. The CAM system 300 may, for example, be a specific implementation of the device 100 according to FIG. 1a or the device 110 according to FIG. 1b. The CAM system 300 may, for example, execute the method 200. Further, the CAM system 300 may execute the above-mentioned method for determining plasmodia in the thick blood film. In other words, the CAM system 300 for computer-assisted microscopy illustrated in FIG. 3 may automate the microscopic search for plasmodia in thick blood films. With the help of this CAM system 300, the work load for the microscopic search for plasmodia in thick blood films may be reduced and the quality of the diagnosis may be increased.

The CAM system 300 illustrated in FIG. 3 comprises an automatic microscope 301, an automatic XY platform 302, a digital camera 303, an illumination system (not illustrated in FIG. 3), a computer (not illustrated in FIG. 3), a monitor 304 and input devices 305.

In connection with the automatic microscope 301 and the XY platform 302, the camera 303 may form the color image recorder 111 according to FIG. 1*b* and for example execute the step 206 of generating the color recording of the method 200.

The computer of the CAM system 300 illustrated in FIG. 3 may comprise the grayscale image provider 112, the binary image provider 113, the identifier 101, the feature extractor 102, the classifier 103 and the characterizer 114 and accordingly the associated method steps may also be executed on this computer of the CAM system 300.

The monitor 304 may be used for displaying the results of the classifier 103 (if no characterizer 114 is used) or for displaying the results of the characterizer 114.

Figure 4:
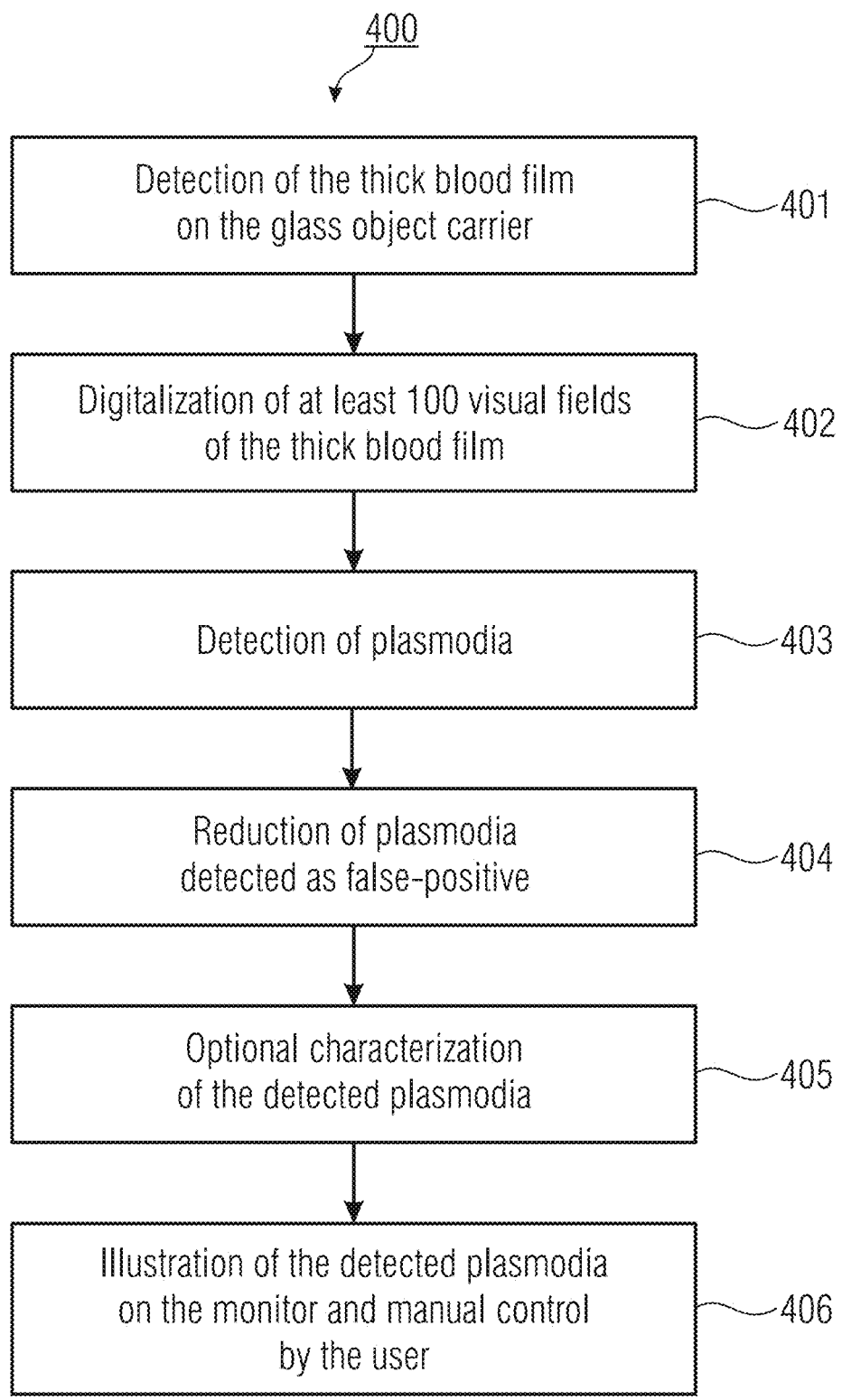
FIG. 4 is a flowchart of a method according to one further embodiment of the present invention based on the example of the detection of plasmodia.

The method for determining plasmodia in thick blood films is now to be described exemplarily with respect to a method 400 illustrated in FIG. 4 according to a further embodiment of the present invention. The CAM method 400 illustrated in FIG. 4 includes the following process steps. Details regarding these process steps are explained in the following.

A first step 401 of the method 400 is the detection of the thick blood film on the glass object carrier.

A second step 402 of the method 400 is digitizing at least 100 visual fields of the thick blood film.

A third step 403 of the method 400 is the detection of plasmodia.

A fourth step 404 of the method 400 is the reduction of false-positively detected plasmodia.

A fifth step 405 of the method 400 is the optional characterization of the detected plasmodia.

A sixth step 406 of the method is the illustration of the detected plasmodia on the monitor and the manual control by the user.

Figure 5A:
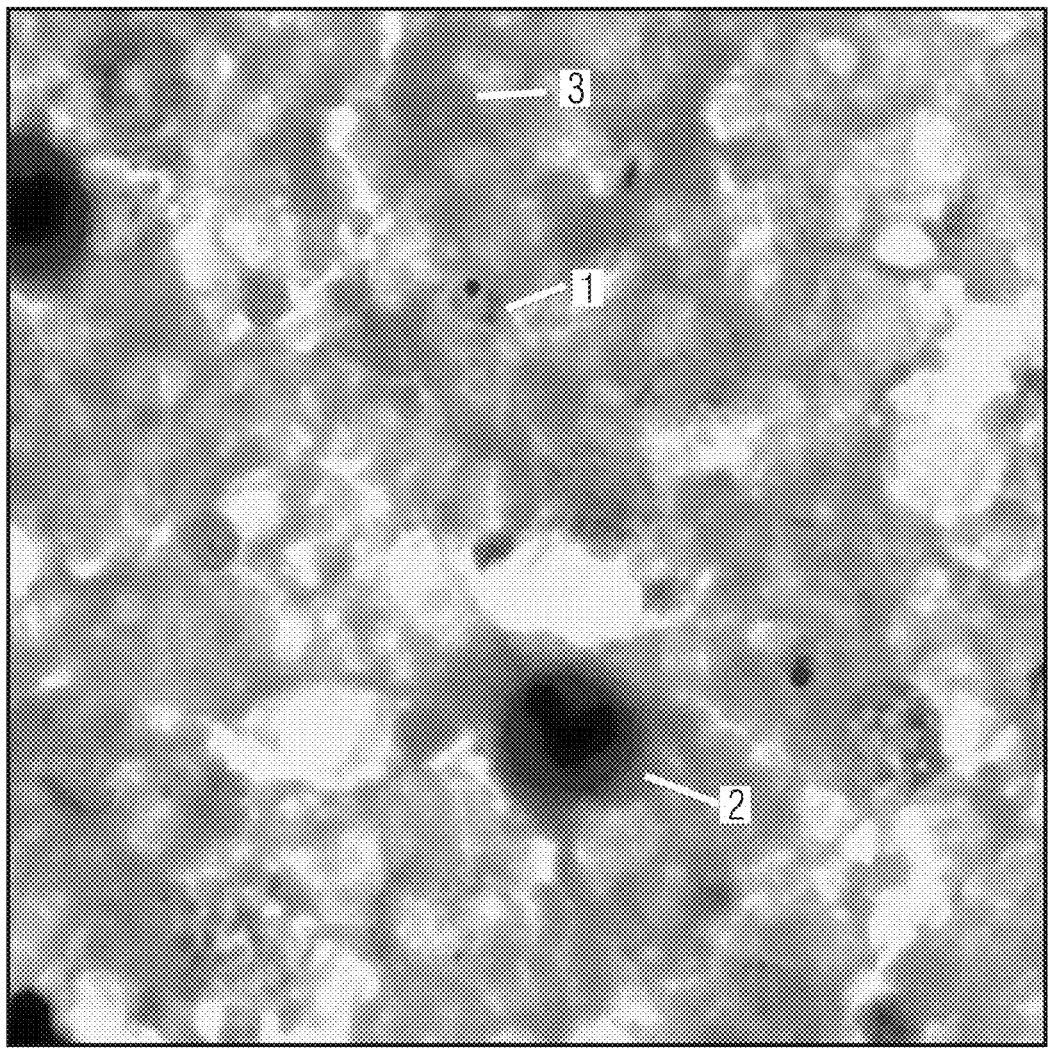
FIG. 5a is an illustration of a magnified partial area of a thick blood film.
Figure 5B:
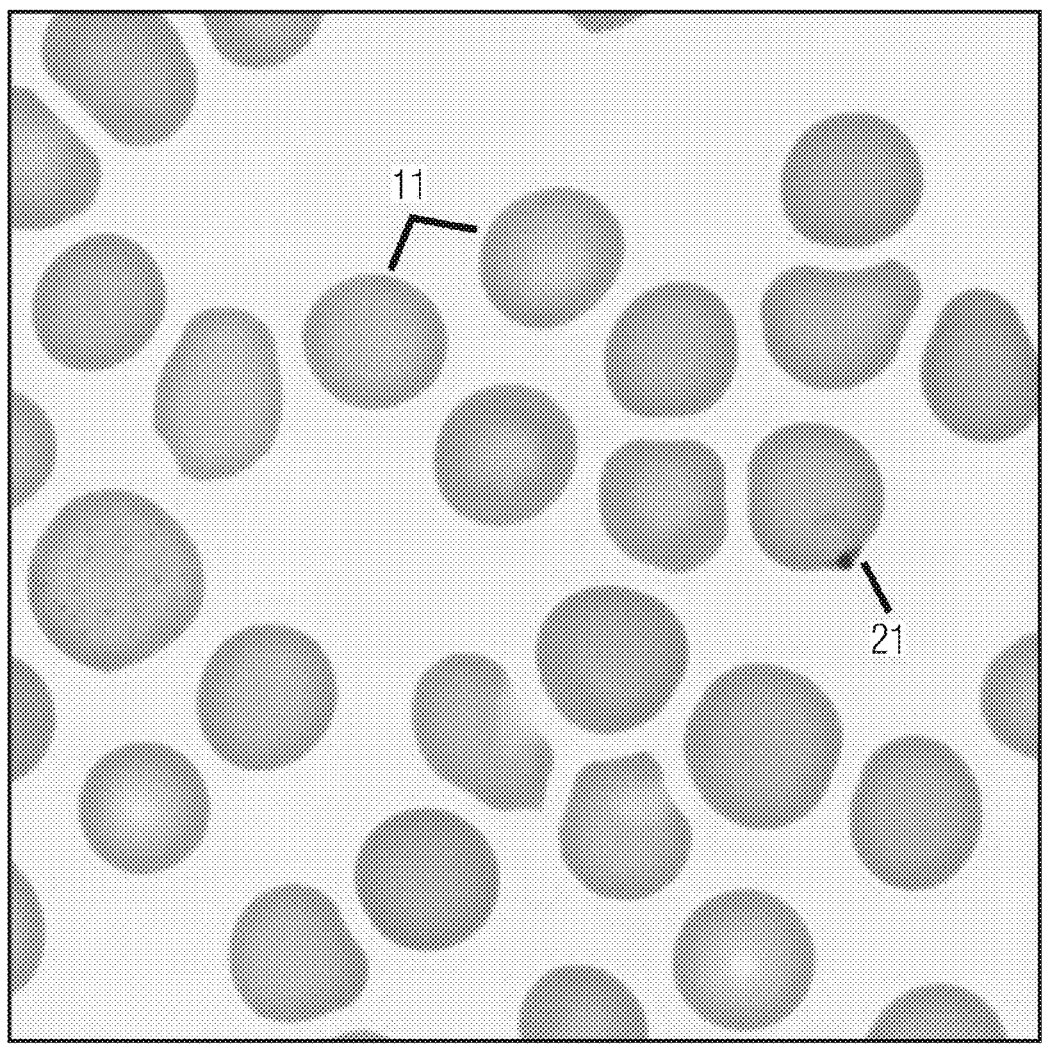

Before the thick blood film can be detected on the glass object carrier in step 401 of the method 400, the thick blood film is generated on the glass object carrier. FIG. 5*a* shows a microscopic recording (using a 100-fold objective) of a thick blood film. In the thick blood film the cell membranes of the erythrocytes are destroyed and the erythrocytes can no longer be seen. In the recording of FIG. 5*a* plasmodia (designated by 1) and leukocytes (designated by 2) can be seen. Apart from that, remains of the dissolved erythrocytes are visible (designated by 3). As a comparative example, FIG. 5*b* shows a microscopic recording (with a 100-fold objective) of a thin blood film. In contrast to the thick blood film, in the thin blood film the cell membranes of the erythrocytes remain intact and the erythrocytes (designated by 11 in FIG. 5*b*) thus remain clearly visible. Plasmodia (designated by 21 in FIG. 5*b*) are visible in the thin blood film as inclusions in erythrocytes. To be able to state that at the time of blood sampling no plasmodia are detectable, the World Health Organization requests an assessment of at least 100 visual fields of the thick blood film (for example using a 100-fold objective and a 10-fold ocular). This corresponds to the examination of approximately 0.25 µl of blood. A plasmodia density of 4 µl of blood would just about be detectable.

In the step 401 of the detection of the thick blood film on the glass object carrier of the method 400, first of all in an automatic method (or method step) the position and the geometry of the thick blood film on the glass object carrier may be determined. This may be executed on the basis of recordings of the glass object carrier with a low enlargement (for example 1× objective or 2.5× objective). In this respect, automatically slightly overlapping recordings of the complete glass object carrier may be made with a small enlargement. These recordings may, for example, be generated by the color image recorder 111, i.e. by the camera 303 of the CAM system 300 illustrated in FIG. 3. The shifting of the XY platform 302 and focusing (along a Z axis) are here automatic. With respect to a coordinate system 306, FIG. 3 shows the XYZ directions. In the image illustrated in FIG. 3, the Y axis for example passes into the drawing plane. With the help of a simple threshold value (for example by converting the RGB color recordings into grayscale recordings and executing a threshold value method with a global threshold value), on the basis of these recordings, the blood film on the object carrier may be localized. As an alternative to the method described here on the basis of an objective with a small enlargement, also an additional camera may be attached to the CAM system 300 (more accurately, to the automatic microscope 301) which has an overview over the whole object carrier and whose recording of the object carrier enables a direct localization of the blood film by means of a threshold value method.

Subsequently, in step 402 of the digitalization of at least 100 visual fields of the thick blood film of the method 400, at least 100 visual fields of the thick blood film may be digitized with a high enlargement (e.g. with a 100-fold objective). This may automatically be done by the automatic microscope 301 by the same selecting a 100-fold objective and controlling the XY platform 302 such that the camera 303 records at least one color recording of each visual field. The visual fields may be selected such that an even distribution across the thick blood film localized in the previous step 401 is guaranteed. In this respect, colored (RGB) individual recordings may be generated. These colored individual recordings may here, for example, be the color recordings 107 of the device 100, 110. Shifting the XY platform 302 and focusing (in the Z axis) may here be done automatically, as described above. It was found that the depth of focus of 100-fold objectives is not sufficient for thick blood films and thus for each visual field three focal planes may be digitized according to further embodiments of the present invention, i.e. for each visual field three color recordings may be generated each with an individual focal plane. These three focal planes may be: the optimum focal plane (for example determined using the Brenner autofocus method) and one plane directly above and one plane directly below.

The step 402 of the digitalization of at least 100 visual fields of the thick blood film may thus, regarding its functionality, correspond to the step 206 of generating the color recording of the method 200 and comprise further optional details. The recording of a thick blood film illustrated in FIG. 5*a* may, for example, be one of the generated individual recordings. The recording illustrated in FIG. 5*a* may thus, for example, be the color recording 107 of the devices 100, 110.

With respect to individual recordings, FIG. 6 shows how the method 400 determines plasmodia existing in the color recording 107.

Figure 6B:
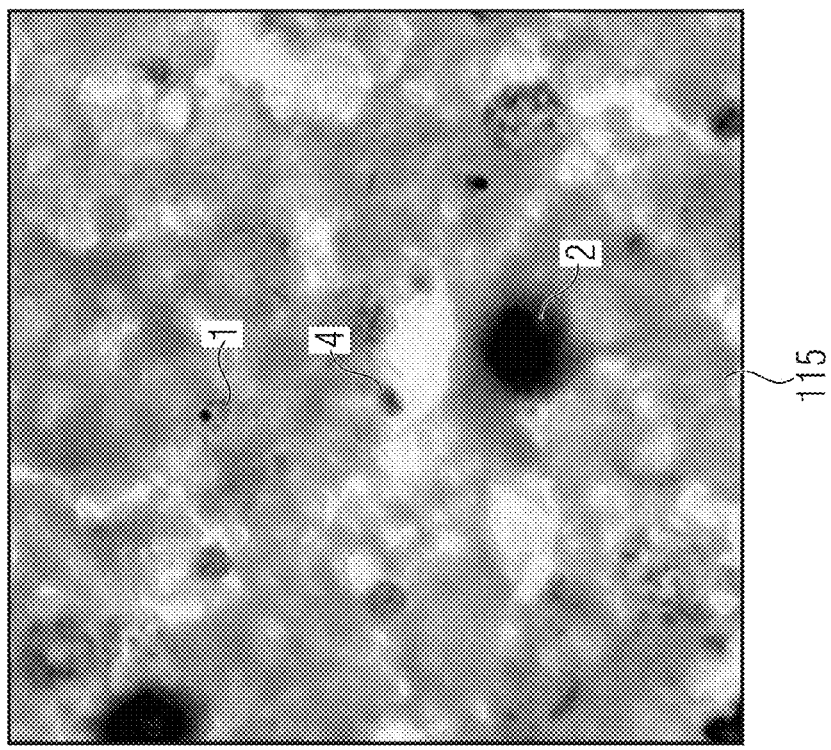
FIG. 6a to FIG. 6f are intermediate illustrations as may result when executing the method according to FIG. 4.
Figure 6A:
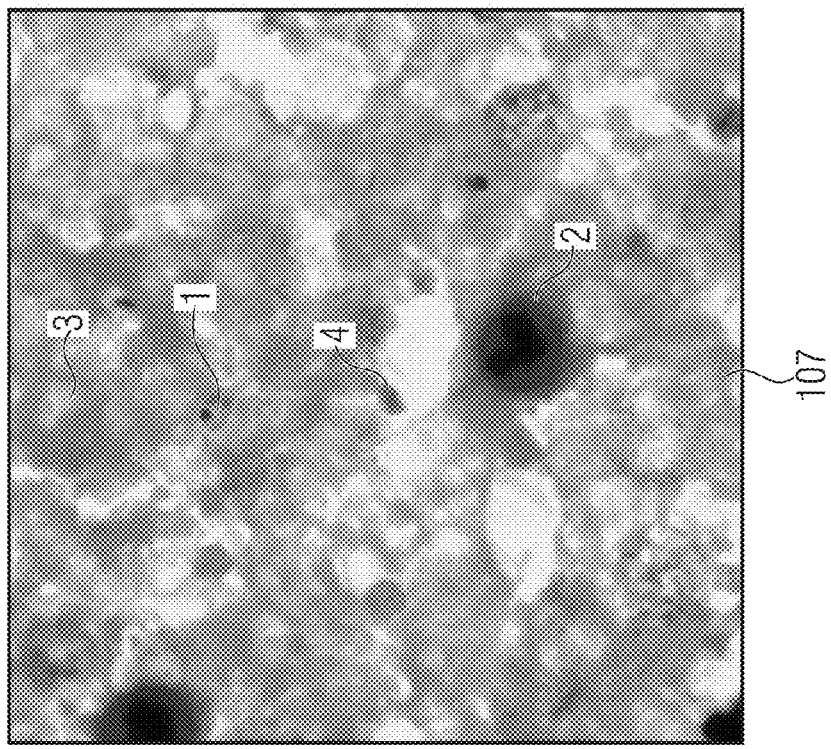

In this respect, FIG. 6*a* shows the color recording 107 which was generated in step 402 as a color recording of one of the at least 100 visual fields. FIG. 6*a* thus shows a recording of a visual field of a thick blood film in a great enlargement.

In step 403 of the method 400 of the detection of plasmodia, a detection of plasmodia is executed in the three recordings (in the three focal planes) of the at least 100 previously digitized visual fields. The detection may here be executed basically on the basis of the specific coloring of blood components containing a cell nucleus (for example plasmodia, leukocytes and thrombocytes). The segmentation may here be based on the characteristic ratio of the values in the green and blue channels of the RGB color recordings. For this purpose, the color image (every color recording) is transformed into a grayscale image using the equation (1);

$$I_{gb}(x, y) = \arctan\left(\frac{I_{green}(x, y)}{I_{blue}(x, y)}\right) \quad (1)$$

$I_{green}$ and $I_{blue}$ are here the green and blue channels of the input image (i.e. the respective color recording). $I_{gb}$ is the resulting grayscale image 115.

FIG. 6b shows the grayscale image 115 which results based on the above-mentioned equation (1) by a transformation from the color recording 107. In other words, FIG. 6b shows the color recording 107 after the transformation into the grayscale image 115 by means of equation (1).

The transformation of the color recording 107 into the grayscale image 115 may, for example, be done by the grayscale image provider 112, for example in step 205 of providing the grayscale image of the method 200.

In the grayscale image 115 gained in this way, subsequently a morphological reduction of the image portions may be executed which represent the background of the grayscale image 115 (this may, for example, be leukocytes, thrombocytes and remains of erythrocytes). Further, an intensifying of image portions may be executed which represent the plasmodia. This may, for example, be done using a morphological "black top hat" filter (on the basis of a circular, flat structural element), which emphasizes small dark structures. The structural element may here be selected such that the diameter of the circle of the structural element corresponds to the maximum diameter of plasmodia. The "black top hat" filter may operate as follows: a copy of the grayscale image 115, morphologically closed using the above-mentioned structural element, is deducted from the grayscale image 115. The grayscale image 115 may, for example, be regarded as a height image, wherein a higher gray value has a great height and a low gray value has a low height. This grayscale image is scanned using the circular flat structural element, so that this structural element falls into holes whose diameter is larger than the maximum size of the largest plasmodia to be determined, so that at these positions low values result and thus areas which may not be plasmodia due to their size are weakened in the morphological copy of the grayscale image 115.

This filtering of the grayscale image 115 may, for example, be executed by the grayscale image intensifier 116 of the device 110 to acquire the intensified grayscale image 119 as a result.

Figure 6D:
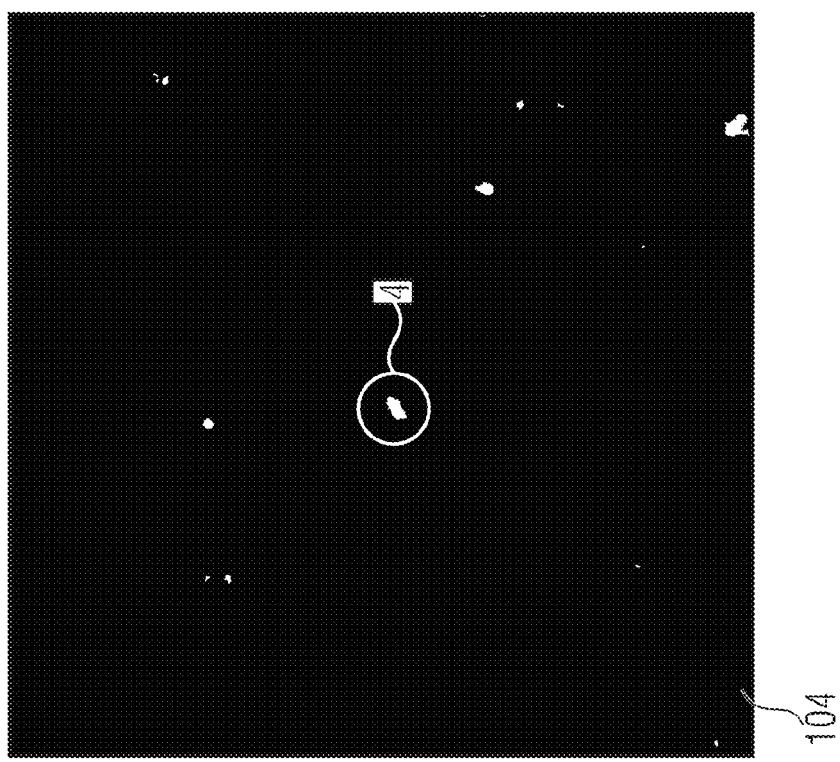
Figure 6C:
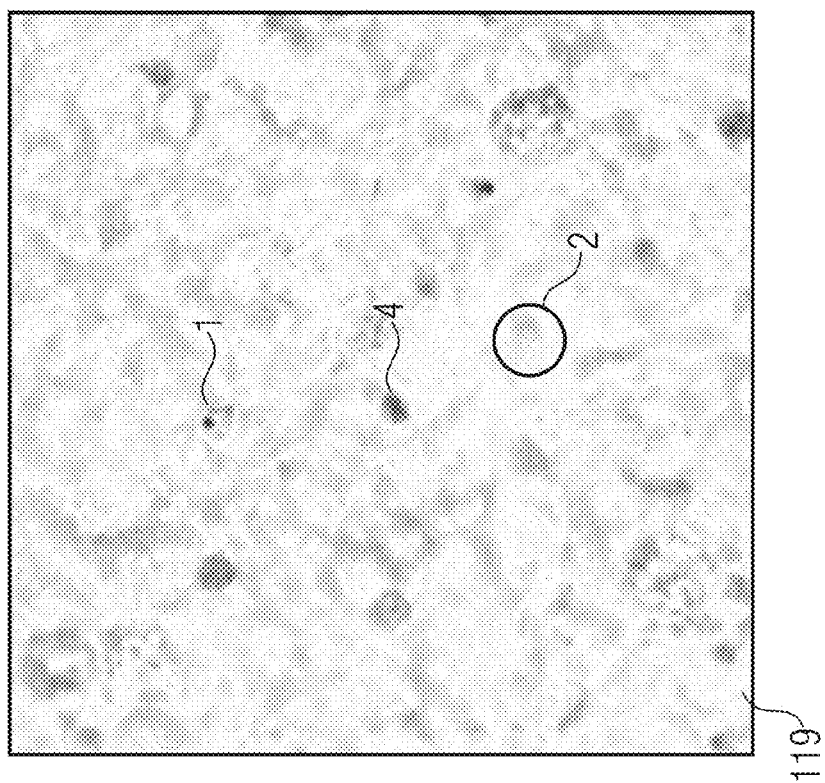

In FIG. 6c the intensified or magnified grayscale image 119 is illustrated which results from the "black top hat" filtering of the grayscale image 115. In other words, FIG. 6c shows the grayscale image 115 after the reduction of the background and the emphasis of the plasmodia using the "black top hat" filter as the intensified grayscale image 119.

In the intensified grayscale image 119 in FIG. 6c, it is clearly obvious that leukocyte 2 which was still clearly obvious in the color recording 107 and the grayscale image 105 was suppressed in the intensified grayscale image 119, while *plasmodium* 1 is still clearly visible, although the gray scales or values of the *plasmodium* 1 and the leukocyte 2 are very similar. The fact may be utilized here, however, that the sizes of the *plasmodium* 1 and the leukocyte 2 are clearly different.

In order to acquire a segmentation of the plasmodia, a threshold value may be determined from the intensified grayscale image 119 resulting from the "black top hat" filter. This may be done automatically with the help of the method according to Otsu (see also document [OTSU, N.: A threshold selection method from gray level histograms. IEEE Trans. Systems, Man and Cybernetics, 9:62-66, 1979]). Based on channel division which was executed in the transformation of the color recording 107 into the grayscale image 115 using equation (1), this method may basically be independent of the illumination. As a result of this method the binary image 104 is acquired.

FIG. 6d shows the binary image 104 which resulted from the application of the threshold value method to the intensified grayscale image 119 of FIG. 6c. In other words, FIG. 16 shows the intensified grayscale image 119 after the segmentation using a threshold value as the binary image 104.

Transforming the intensified grayscale image 110 into the binary image 104 may, for example, be executed by the image converter 117 of the device 110. Subsequently, connected objects in the binary image 104 may be found using the above-mentioned "connected component labeling algorithm". A "connected component" is an amount of pixels wherein each pixel is connected to all other ones. In the "labeling" process different "labels" are associated to all such amounts in order to be able to uniquely allocate the same. Or in other words, image elements of the same binary value which are adjacent to each other or connected to each other via image elements of the same binary value are each grouped into a common connected region. This step of finding the connected objects by means of the "connected component labeling" algorithm may, for example, be executed by the region finder 118 of the device 110.

It was found that not all such localized objects (in all connected regions) are plasmodia and thus the found objects (the found connected regions) may be filtered in a further step. Only those objects (those connected regions) are regarded as plasmodia whose size and/or shape correspond to those of plasmodia. This step of selecting those connected regions whose size and/or shape correspond to those of plasmodia may, for example, be executed by the identifiers 101 of the devices 100, 110, for example in the step 201 of identifying connected regions of the method 200.

Figure 6F:
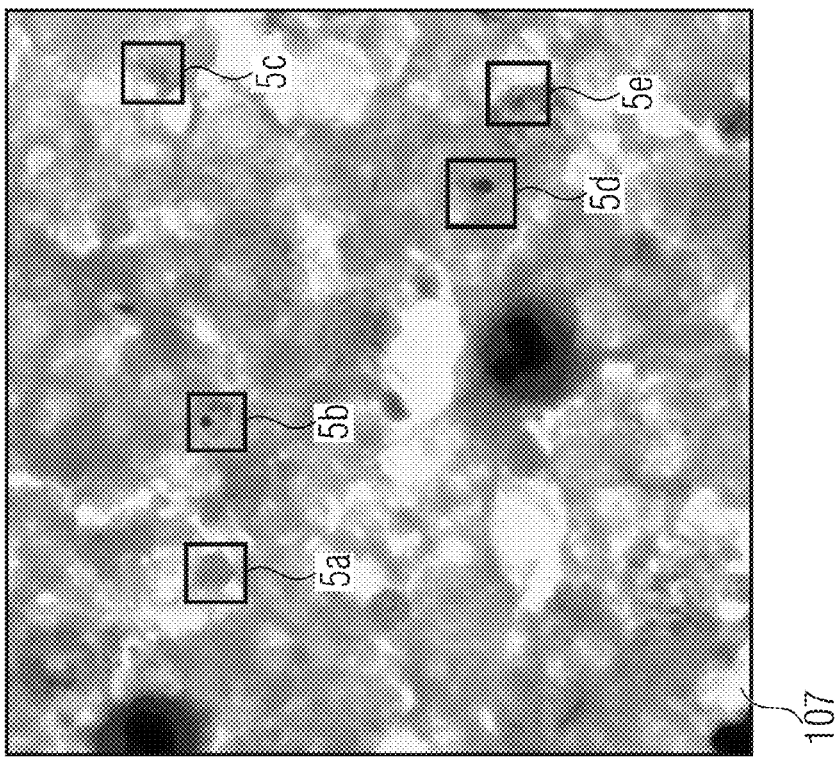
Figure 6E:
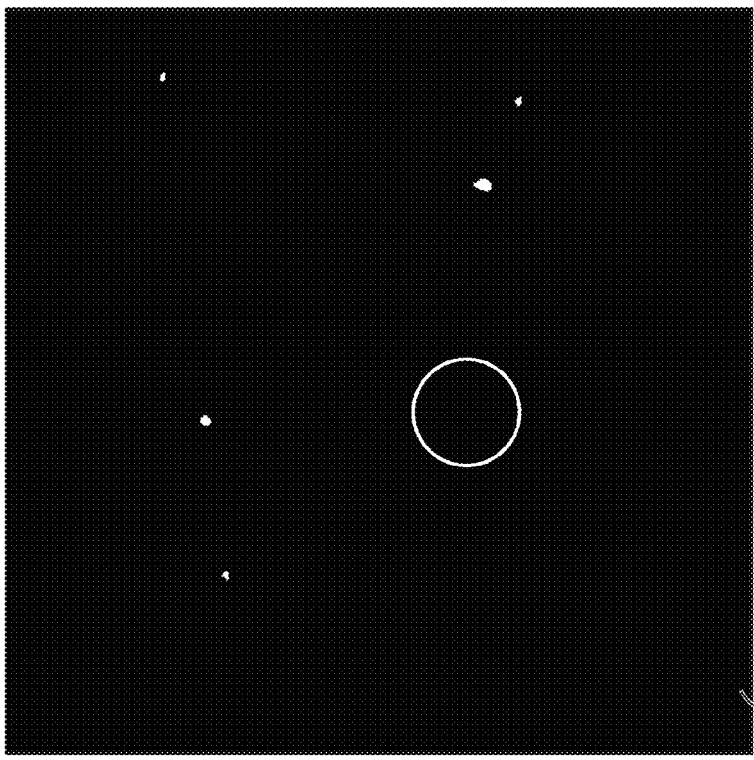

FIG. 6e shows the binary image 104 after filtering the detected objects on the basis of their shape and size as a reduced binary image 106. An object 4 existing both in the color recording 107 and also in the grayscale image 115, the intensified grayscale image 119 and the binary image 104 which does not represent a *plasmodium* may be filtered out using this step as it becomes clear from the comparison of the binary image 104 to the reduced binary image 106. In the reduced binary image 105, the object 4 (marked by a white circle) no longer exists. In the reduced binary image 106, five objects or connected regions still exist which may be considered to be plasmodia. It was found that the detection of plasmodia on the basis of the previous step results in a high sensitivity but a low specificity. I.e., (virtually) no plasmodia are missed, but some (or in some cases many) other components may erroneously be detected as a *plasmodium*.

For this reason, in the step 404 of the reduction of false-positively detected plasmodia of the method 400, a reduction of the false-positive plasmodia by means of a classification method may be executed. The classification of the previously detected plasmodia (the identified connected regions) may here be executed into the classes (in the two disjunct groups) "*plasmodium*" and "no *plasmodium*" using a support vector machine (SVM). This classification may here be done on the basis of shape, texture and/or color features extracted from a section of the color image (the color recording 107) enclosing the respective *plasmodium* (the respective identified connected region). This step 404 of the reduction of plasmodia detected as false-positive may, for example, be executed by the feature extractors 102 in connection with the classifiers 103 of the devices 100, 110, for example in the step 202 of extracting a feature set for each identified connected region and the step 203 of classifying the identified connected regions of the method 200.

The above-mentioned support vector machine (SVM) may previously have been trained with corresponding features extracted from a database with reference image sections annotated by hand as being "*plasmodium*" or "no *plasmodium*".

FIG. 6f shows the color image 107 with marked sections 5a to 5e which each enclose the identified regions and thus also objects existing in the reduced binary image 106.

Figure 7A:
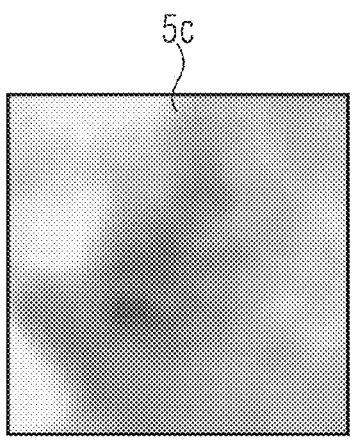
FIGS. 7a to 7e are illustrations of sectional views which may exist in the method according to FIG. 4 before the step of the reduction of false-positively detected plasmodia.
Figure 7B:
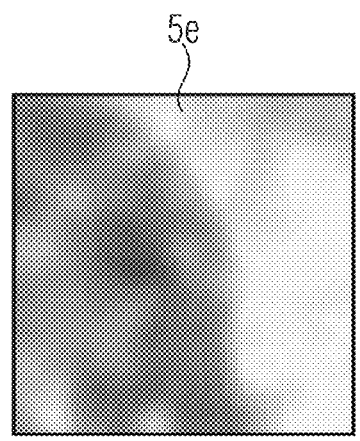
Figure 7C:
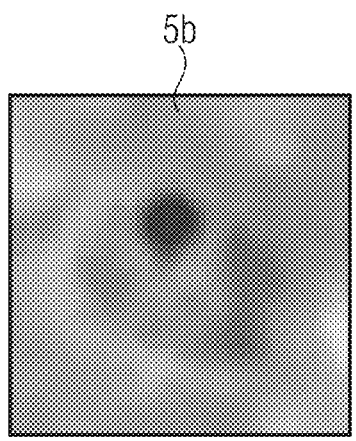
Figure 7D:
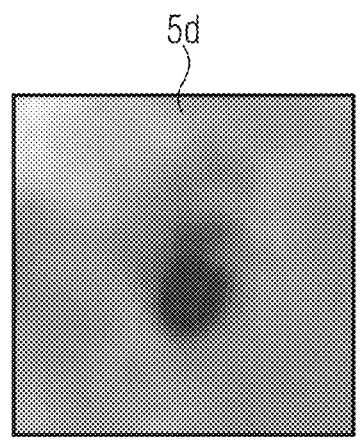
Figure 7E:
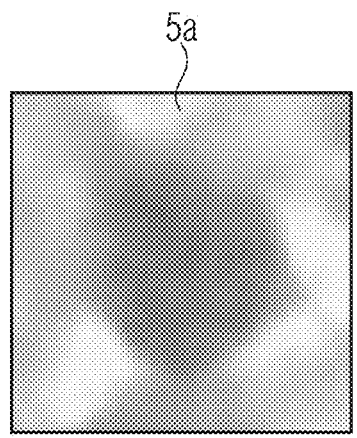
Figure 8:
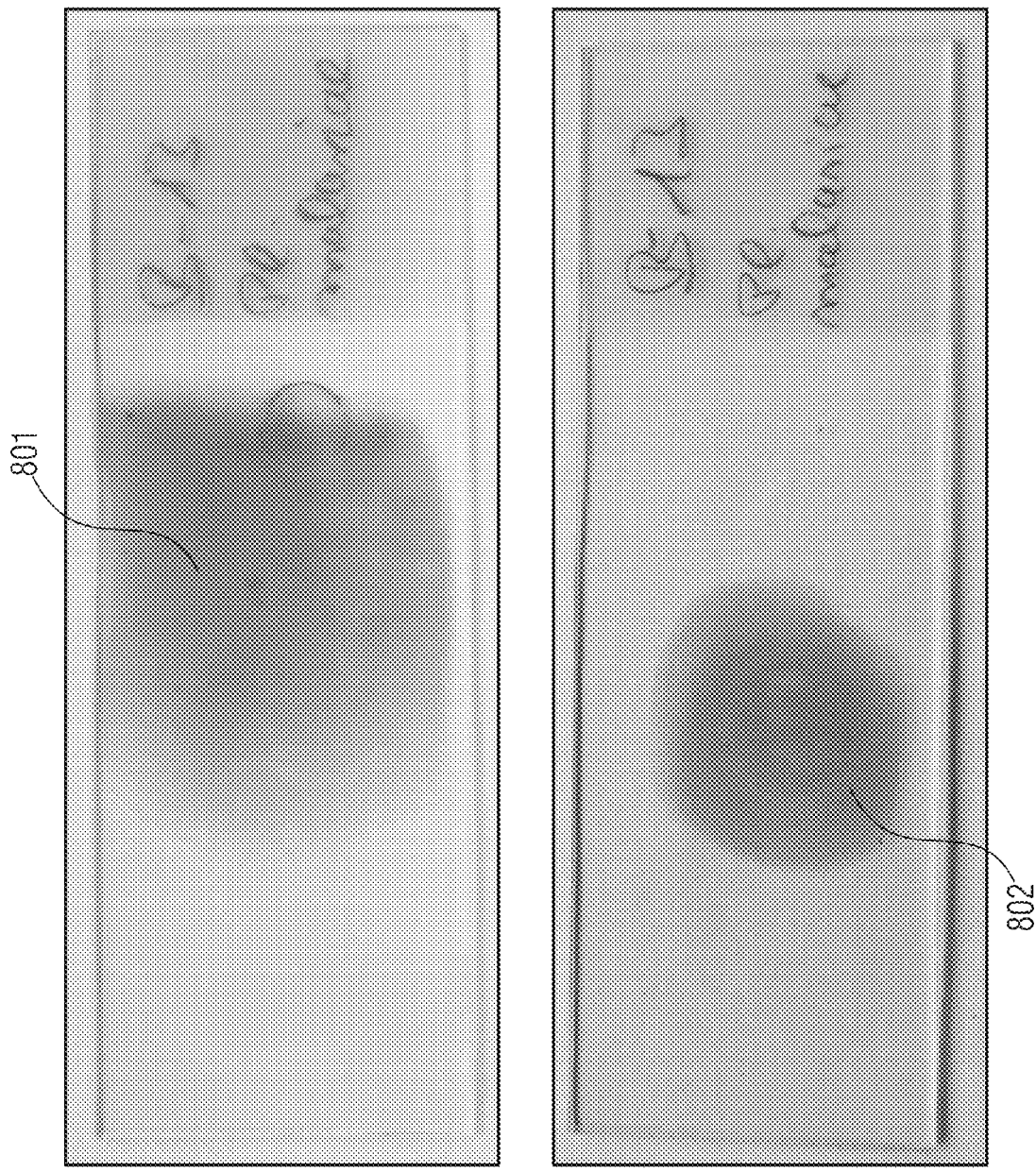
FIG. 8 is a comparative illustration between a thick blood film and a thin blood film.

FIGS. 7a to 7e show the sections 5a to 5e again in close-up. FIG. 7a here shows the section 5c in close-up, FIG. 7b shows the section 5e in close-up, FIG. 7c shows the section 5b in close-up, FIG. 7d shows the section 5d in close-up, and FIG. 7e shows the section 5a in close-up. In other words, FIGS. 7a to 7e show the classification step for the reduction of false-positive plasmodia.

In the step 403 of the detection of plasmodia in the exemplary example five plasmodia were found (visible at the five objects in the reduced binary image 106). However, three of those five detection results are false-positive plasmodia. In order to identify false-positive plasmodia, thus in step 404 of the detection of plasmodia detected as false-positive, first of all the small sections 5a to 5e are generated from the visual field (from the color recording 107) which are each centered on the detected plasmodia (in this respect see FIGS. 7a to 7e). Subsequently, from these image sections 5a to 5e, color, texture and/or shape or form features may be extracted and, on the basis of the same by means of the support vector machine (SVM), the real plasmodia may be differentiated from false-positive detections. In the present example, in this way the objects present in sections 5b and 5d which are illustrated in FIGS. 7c and 7d may be identified as real plasmodia and the objects present in sections 5c, 5e, 5a which are illustrated in FIGS. 7a, 7b, 7e may be identified as false-positive plasmodia. Using the classifiers 103 of the device 100, 110 for the step 404 of the reduction of plasmodia detected as false-positive, for example by using the step 203 of classifying the identified connected region of the method 200, the correct-positive plasmodia may be associated with the first disjunct group 109a and the false-positive plasmodia may be associated with the second disjunct group 109b.

After the step of the reduction 404 of plasmodia detected as false-positive, the method 400 may comprise the step 405 of the (optional) characterization of the detected plasmodia. In this optional step, the detected plasmodia may be classified using a further classification method into the classes "*Plasmodium falciparum*", "*Plasmodium vivax*", "*Plasmodium ovale*" and "*Plasmodium malariae*". The classification may here be done using a support vector machine specially trained for this task and on the basis of form, texture and/or color features. This step 405 of the (optional) characterization may, regarding its functionality, correspond to the step 207 of the characterization of all connected regions of the method 200 associated with a first disjunct group and may, for example, be executed by the characterizer 114 of the device 110.

In the step 406 of the illustration of the detected plasmodia on the monitor and the manual control by the user, the detected plasmodia and a statistical evaluation may be illustrated on the monitor 304 of the CAM system 300. Apart from the sectional recordings (for example the recordings 7c, 7d of the detected correct-positive plasmodia) in each case the classification probability resulting from the support vector machine for the false-positive reduction may be illustrated. Additionally, the type of *plasmodium* determined in the optional characterization step 405 may be displayed together with the associated classification probability (e.g. *Plasmodium vivax* 70%). Also an extrapolation of the number of plasmodia per µl of blood may be displayed by the system. The user may have the possibility of correcting an erroneous detection or erroneous characterization by means of drag and drop. On the basis this display, the user may execute the final diagnosis of the current blood film as "infected by plasmodia" or "not infected by plasmodia".

Apart from that, the user may draw conclusions as to the number of plasmodia in each µl of blood and to the existing type of plasmodia (e.g. *Plasmodium falciparum*) from the display of the detected plasmodia. In addition, the system may enable the illustration of the digital visual fields in high enlargement upon the request of the user.

It was found that, as the thick blood film is not fixed, the shape of the plasmodia is not well conserved. Thus, the method 400 may further comprise a step of determining the plasmodia on the basis of an addition thin blood film. In other words, the differentiation of the different types of plasmodia may additionally be done on the basis of an additional thin blood film.

In the following, with respect to FIGS. 9-14 a further detailed example for the detection of plasmodia in a thick blood film is to be given.

Figure 10:
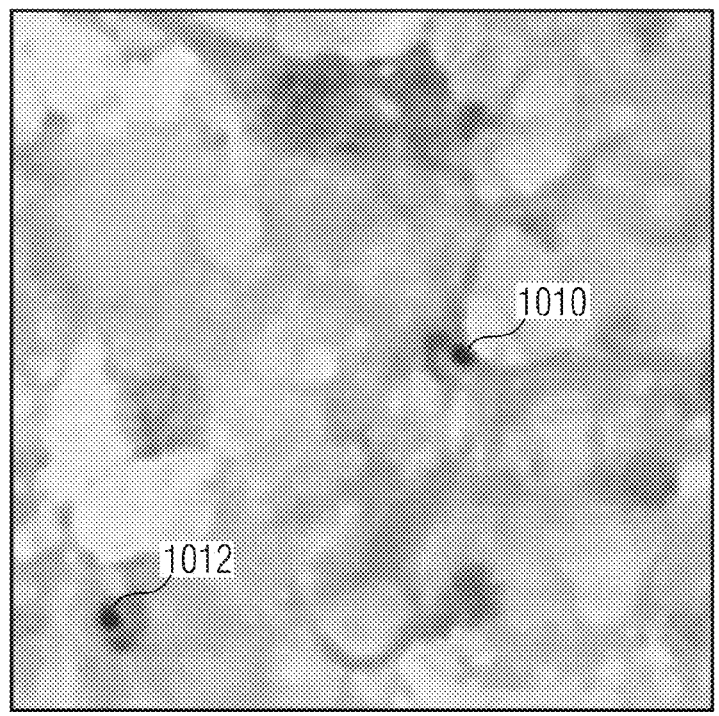
FIG. 10 is a section of a color recording with 2 plasmodia.

As an example, 256 1000×1000 pixel images of a Giemsa-colored thick blood film were recorded using a high enlargement and using a ×100 oil immersion objective with an optical aperture of 1.3, mounted on an Axio Imager microscope and a color CCD digital camera. Care was taken that guaranteeing consistent illumination conditions and white balance was done for all images. FIG. 10 shows a part of a sample image from the data set. This image set was randomly separated into two subsets (each having 128 images) for training and testing. The training set is used for algorithm development, parameter adaptation, feature selection and training a classifier (for example the classifier 103). The test set is only used for evaluating the detection performance.

The detection algorithm according to embodiments has two stages. The focus of the first stage (plasmodia detection, for example in the form of steps 401-403 of the method 400) is on a high detection sensitivity with the disadvantage of relatively high numbers of false-positive detections. The second stage (false-positive reduction, for example in the form of steps 404-406 of the method 400) uses an SVM classifier (SVM=support vector machine, for example the classifier 103), in order to reduce the number of false-positive detections to an acceptable level while the detection sensitivity of the first stage is maintained.

On the first stage of the plasmodia detection, plasmodia candidates are detected focusing on high sensitivity, while a possibly low specificity is accepted. This means that the algorithm is designed to miss none or only very few of the plasmodia, which may, however, lead to false-positive detections. The example presented here concentrates on the detection of the trophozoite growth stage of *Plasmodium falciparum* parasites. Trophozoites appear as small rings or parts of rings having one or two chromatin points. Apart from plasmodia, leukocytes and thrombocytes or platelets are the only blood components which contain chromatin. Thus, the first step (for example step 205 of the method 200) of the detection algorithm is to find chromatin-containing objects. It was found that the portion of green and blue components of an image of a blood film is a very good feature for identifying chromatin-containing objects in Giemsa-colored blood films. This not only a strongly differentiating feature, but also almost independent of differences regarding illumination and coloring intensity. $I_{green}(x,y)$ and $I_{blue}(x,y)$ designate the green or blue channel of the input image. The colored input image (the color recording 117) is converted on the basis of equation 1 (by the grayscale image provider 112) into a monochrome image $I_{gb}(x,y)$ (the grayscale image 115) which emphasizes chromatin-containing objects.

$$I_{gb}(x, y) = \arctan\left(\frac{I_{green}(x, y)}{I_{blue}(x, y)}\right) \quad (1)$$

Figure 11:
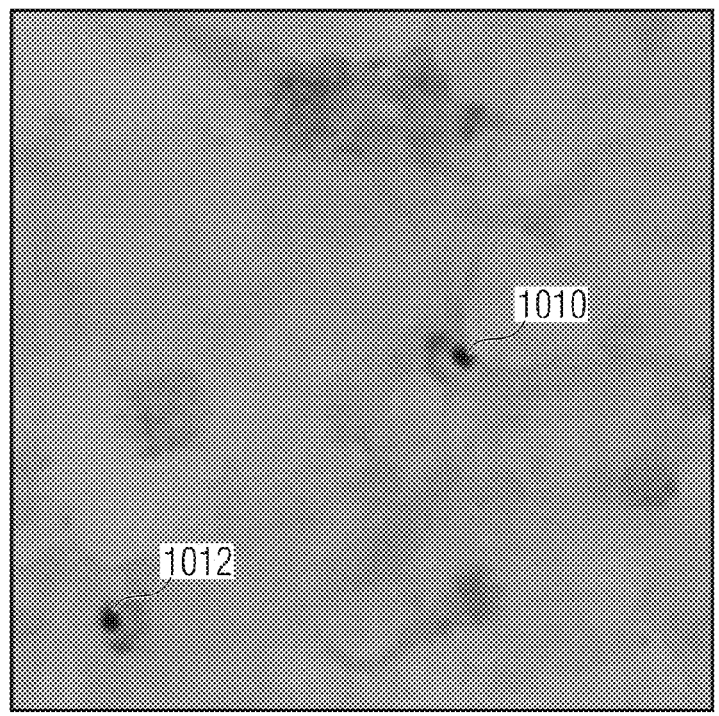
FIG. 11 is a section of the grayscale image gained from the color recording illustrated in FIG. 10.

A section of the colored input image is illustrated in FIG. 10. In this section, two plasmodia 1010, 1012 may be detected. FIG. 11 shows the converted section into the monochrome grayscale image, wherein the objects containing chromatin, i.e. the plasmodia 1010, 1012 are more prominent.

In the resulting monochrome image $I_{gb}(x,y)$ (in the grayscale image 115), objects with chromatin have dark gray levels and objects which contain no chromatin have light gray levels.

The next step (for example step 201 of the method 200, utilizing the binary image provider 113) of the algorithm is to separate potential plasmodia from other chromatin-containing objects like leukocytes, platelets and artifacts (such as, for example, splintered parts of leukocytes): plasmodia can be separated from leukocytes on the basis of their characteristic shape. Further, they may be separated from platelets on the basis both of their characteristic shape and also color intensity. Separating plasmodia from artifacts is more difficult and is thus not addressed at this stage of the algorithm. It was found that the morphological black top hat operator is an excellent mechanism for separating the plasmodia from both leukocytes and also platelets. The black top hat operator is defined as a morphological closing (morphological dilation followed by morphological erosion) of an image followed by the subtraction of the closed image from the input image. The generalization of this morphological operator from binary into monochromatic images and a special non-flat structuring element for achieving a separation of plasmodia from leukocytes and platelets are used. It was found that a non-flat structuring element representing a paraboloid is very well suited for this task. The inclination of the paraboloid is set to one pixel and the radius (based on the typical shape of plasmodia) is set to seven pixels. These parameters may be determined for the system and only have to be adapted in case of a change in the pixel size (i.e. when the camera or the objective is changed). FIG. 9 shows the paraboloid structuring element, wherein in FIG. 9 the paraboloid comprises a radius of nine pixels and an inclination of one pixel.

The black top hat operator (which is, for example, applied by the grayscale image intensifier 116) is followed by a threshold operation (for example executed by the image converter). It was found that, due to the independence of the portion of the green and the blue component with respect to illumination and coloring intensity, a global determined threshold is sufficient for this step.

Figure 12:
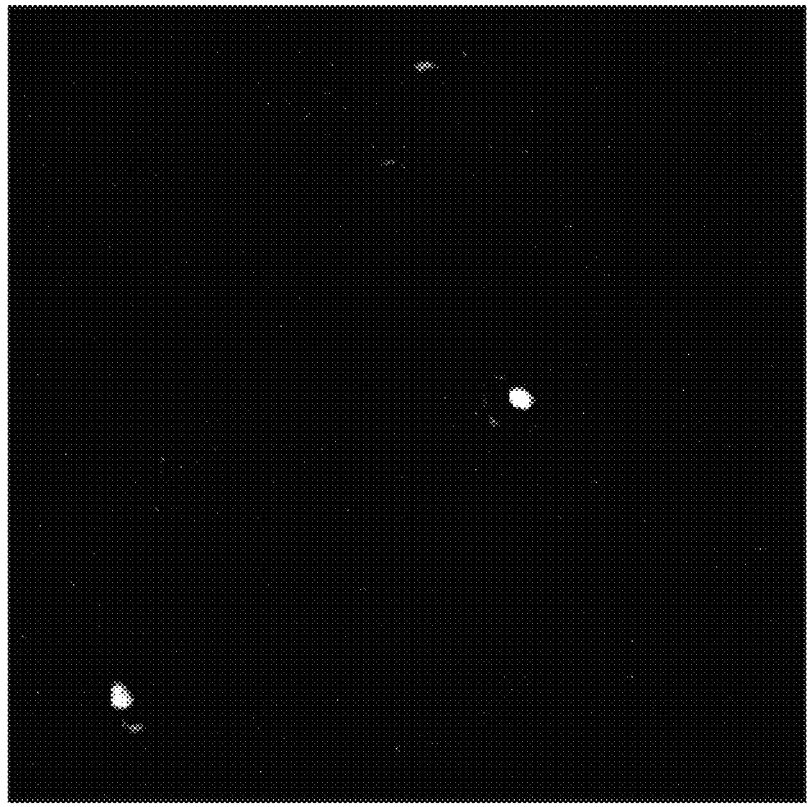
FIG. 12 is the section illustrated in FIG. 11 after the application of the "black top hat" operator.

A morphological erosion with a circular flat structuring element is applied to merge neighboring points in the binary image (the binary image 104) which result from the threshold operation using the region finder 118. The radius of the circular structuring element is selected equal to the radius of the structuring element which is applied in the black top hat operator. The last step of this detection stage is the extraction of positions of plasmodia candidates using the identifier 101 by the use of a simple naming algorithm of connected components (for example utilizing the connected component algorithm) for extracting objects from the binary image 104. The main points of the extracted objects are regarded as positions of plasmodia candidates. FIGS. 10 to 12 represent the main steps of the detection stage of plasmodia candidates. In FIG. 12 the intensified grayscale image 119 is illustrated after the black top hat operator has been applied to the grayscale image 115 in order to identify the plasmodia candidates.

Due to the focus on high sensitivity plasmodia candidates detected in the previous stage of plasmodia detection may be false-positive detections. Thus, as the second stage of the detection algorithm a false-positive reduction step is applied (for example step 404 of the method 400 or steps 202, 203 of the method 200 utilizing the feature extractor 102 and the classifier 103). The basic idea of this stage is to cut a small region of interest (ROI) for each plasmodia candidate from the input image 107 (as are exemplarily shown in FIGS. 7, 13 and 14) to extract a set of features 108 from the ROI and to classify the ROI based on the set of features 108 as "plasmodium" or "artifact". In more detail, ROIs with a size of 80×80 pixels which are centered on the positions of the plasmodia candidates are cut out from the input image 107.

Figure 13:
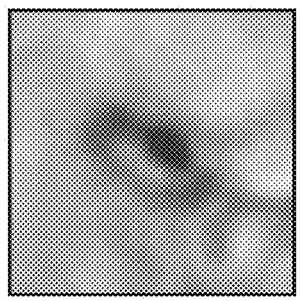
FIG. 13 are ROIs of correct-positively detected plasmodia.
Figure 13:
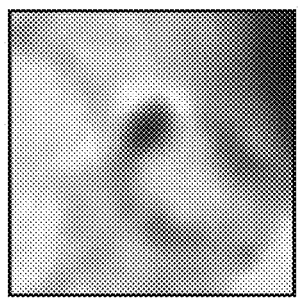
Figure 13:
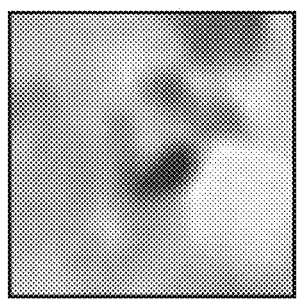
Figure 13:
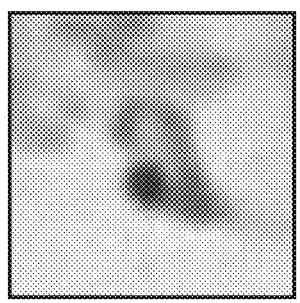
Figure 13:
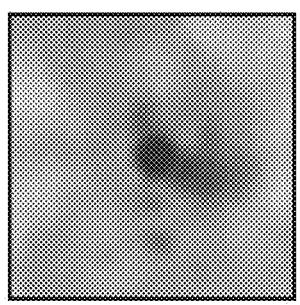
Figure 14:
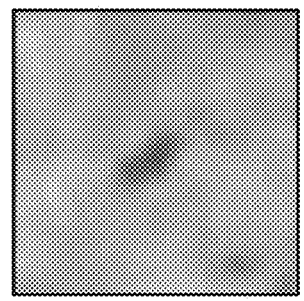
FIG. 14 are ROIs of false-positively detected plasmodia.
Figure 14:
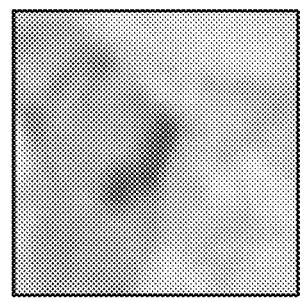
Figure 14:
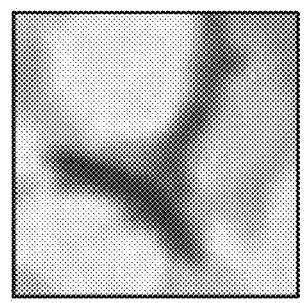
Figure 14:
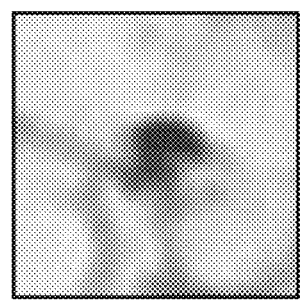
Figure 14:
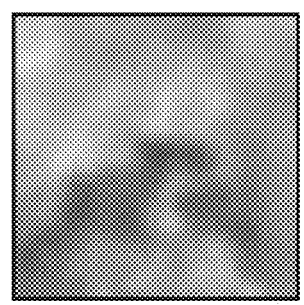

In FIG. 13 examples of plasmodia ROIs (so-called "ground truth" plasmodia) which were detected as correct-positive in the stage of plasmodia detection are illustrated, while in FIG. 14 examples of plasmodia ROIs are illustrated which were detected as false-positive in the stage of plasmodia detection.

Subsequently, a large set of features is extracted using the feature extractor 102 (for example in step 202 of the method 200), including statistical momentary features, texture analysis features and color features (for each ROI). The set of statistical momentary features here contains central moments (average value, variance, inclination and curvature), the set of seven invariable moments by Hu [see also: M. Hu. Visual pattern recognition by moment invariants. *IRE Trans. On Information Theory*, IT-8: 179-187, 1962] and the 49 zernike moments with orders of magnitude up to 12 [see also: A. Khotanzad and Y. H. Hongs. Invariant image recognition by zernike moments. *IEEE Transactions on Pattern Analysis and Machine Intelligence*, 12(5): 489-497, 1990]. The texture features include thirteen matrix features of a common occurrence of Haralick [see also: R. M. Haralick, K. Shammugam and I. Dinstein. Textural features for image classification. *IEEE Transactions on Systems, Man, and Cybertinetics*, 3(6): 610-621, 1973], 18 sum and difference histogram features by Unser [see also: M. Unser. Sum and difference histograms for texture classification. *IEEE Trans. Pattern Anal. Mach. Intell.*, 8(1): 118-125, 1986], 16 statistical geometric features by Chen [see also: Y. Q. Chen, M. S. Nixon and D. W. Thomas. Statistical geometric features for texture classification. *Pattern Recognition*, 28(4): 537-552, 1995] and five features proposed by Young et al. [see also: I. T. Young, P. W. Verbeek and B. H. Mayall. Characterization of chromatin distribution in cell nuclei. *Cytometry*, 7(5): 467-474, September 1986], which describe the distribution of chromatin in the ROI. The color features include 60 features which represent a 60-bin histogram of the color tone channel of the ROI and two features which were described by Kovalev et al. [see also: V. Kovalev, A. Y. Grigoriev and H.-S. Ahn, Robust recognition of white blood cell images. In *ICPR, 96: Proceedings of the International Conference on Pattern Recognition (ICPR, 96) Vol. IV-Vol.* 7472, p. 371, Washington, D.C., USA, 1996, IEEE Computer Society], which represent the cyan shifts in the ROI. According to further embodiments, also only part of the above-mentioned features may be extracted. Further, in other embodiments also further features (not mentioned here) may be extracted from the ROIs.

All in all, the feature space has 174 dimensions which may necessitate a selection of a partial set of features in order to prevent the curse of dimensionality. Further, all features are standardized so that they have an average value of 0 and a standard deviation of 1.

An optimum partial set of features may be selected in a two-stage training method. First of all, a one-dimensional classification is applied to maintain only those 60 features which have the highest unidimensional classification performance. Then a genetic algorithm is used for an automatic selection of an even smaller partial set of features as is proposed by Vafeie and De Jong [see also H. Vafaie and K. D. Jong. Genetic algorithms a tool for feature selection in machine learning. In *Proceedings of the 4$^{th}$ International Conference on Tools with Artificial Intelligence*, pp. 200-204, Arlington, Va., USA, 1992. IEEE Computer Society Press].

The main problems when applying a genetic algorithm to a specific problem are to select a sufficiently objective function and an appropriate representation of candidate problem solutions (individuals).

A suitable and simple illustration of individuals for the problem of selecting a good subset from a set of N features is a binary string having the length N. When the bit at one position i is set to 1, wherein $0 \leq i \leq N$, the i$^{th}$ feature is contained in the subset which is represented by the respective individual. In order to prevent a feature selection distortion, the selection is strictly based on the training image set and not on the test image set. As soon as a good feature subset (from the above-mentioned 174 features) has been selected, utilizing an SVM the classifier 103 is trained based on this feature subset and the training data set in order to solve the 2-class classification problem (the classification into the two groups 109a, 109b) of a classification of an ROI as a "*plasmodium*" or an "artifact". An SVM having a radial basis functional core with y=0.125 and a cost factor of C=1.0 may be applied with respect to this task.

In other words, the classifier 103 is trained once using the training data set in order to then use the trained classifier 103 for the detection of the plasmodia existing in the color recording 107 (in which the number of plasmodia is not known in contrast to the training data set). In the training phase of the classifier 103, the above-mentioned 174 features are evaluated with respect to their discriminating characteristics on the training data set and the 60 best features are taken over. From the 60 features, again using the genetic algorithm, a small part is selected. The classifier 103 is trained on this small part (the selected partial set of features) using the SVM.

For the (later) use of the classifier 103 for the detection of plasmodia (for example in the color recording 107), then only this selected feature subset may be extracted from the ROIs (by the feature extractor 102). Accordingly, in the training phase also the feature extractor 102 may be set in order to extract only this selected feature subset from the ROIs.

The performance of the two-stage plasmodia detection algorithm may be evaluated as follows. A set of 266 ROIs with 80×80 pixels which all contain commented ground truth plasmodia contained in the training data set is extracted. The first stage of the detection algorithm is applied to the training data set in order to acquire a set of 612 ROIs with 80×80 pixels which show false-positive detections. Training the second stage of the detection algorithm is based on those ROI sets. Exemplary ROIs are illustrated in FIGS. 13 and 14.

Figure 15:
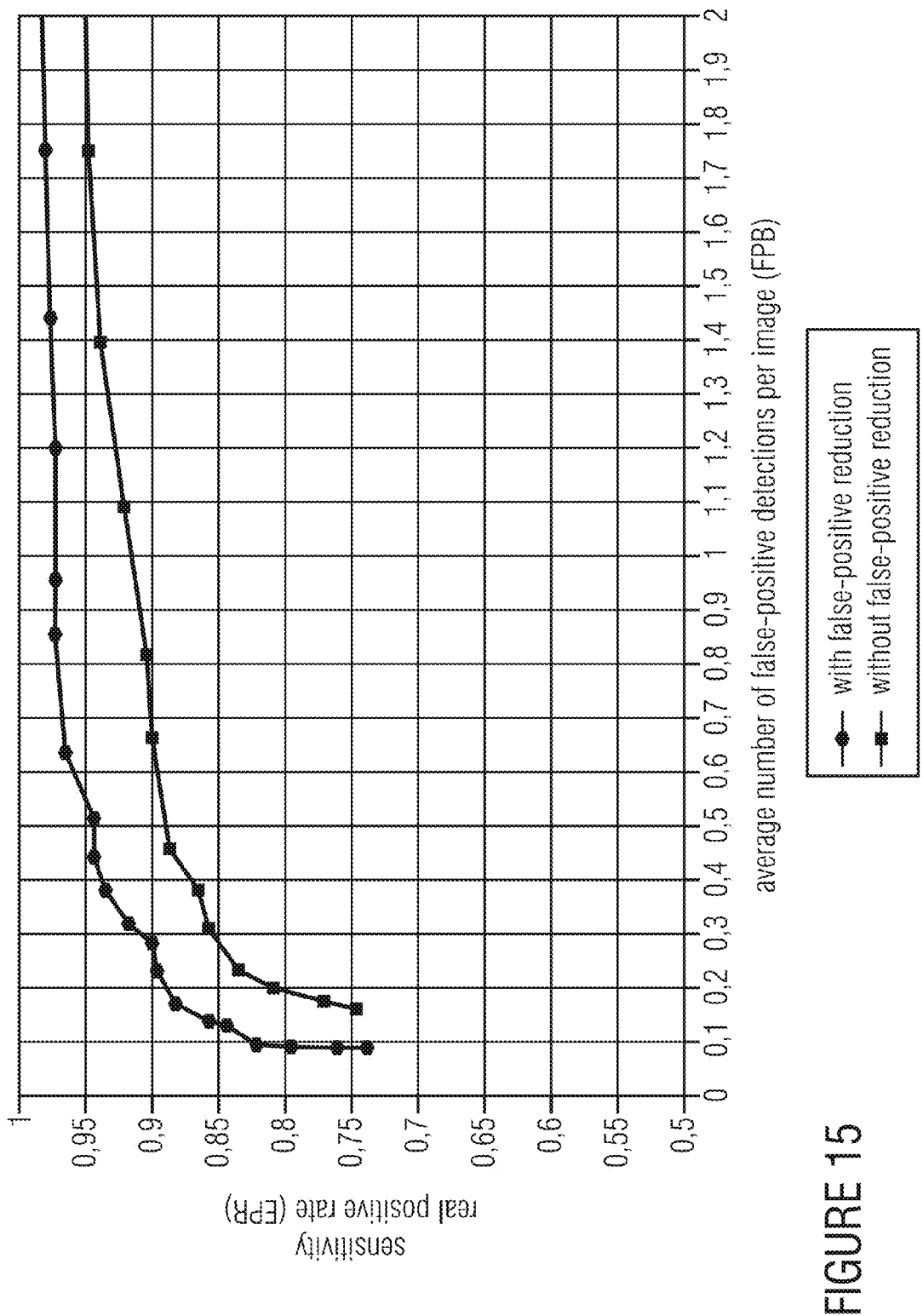
FIG. 15 is a diagram for illustrating the average number of false-positive detections per image (FPB; falsch-positive Erfassung pro Bild) depending on a real-positive rate (EPR; Echt-Positiv-Rate) in one embodiment.

A feature set is extracted from each ROI and an optimum feature subset is acquired, as was described in the previous section. Then, the SVM is trained based on the feature subsets of the 266 ground truth plasmodia and the 612 false-positive detections extracted from the training data set. The evaluation of the detection performance is based on the test data set. The first stage of the detection algorithm is applied to all images of the test set in order to acquire positions of plasmodia candidates. Each plasmodia candidate is represented by a feature vector extracted from an ROI which is centered at the detected position and is classified using the SVM. Plasmodia candidates classified as "artifacts" are considered as false-positive detections and are discarded. The remaining candidates are regarded as plasmodia. The ground truth segmentations of the test data set are used to identify each detection as truly positive (EP; echt positiv) or false-positive (FP; falsch positiv). The truly positive rate (EPR), also referred to as sensitivity, and the average number of false-positive detections per image (FPB; falsch-positive Erfassung pro Bild) are calculated based on those values. Pairs of EPR and FPB values may be acquired by using different values for the threshold parameter of the first detection stage. The EPR and FPB pairs are illustrated in FIG. 15 as an FROC curve (FROC=free response receiver operating characteristic). For examining the effect of the false-positive reduction stage, the EPR and FPB pairs are imaged in the same way for the same setup, but with a deactivated false-positive reduction. With a reasonable sensitivity of 0.97, the algorithm works without a false-positive reduction with 3.2 FPB and 0.8 FPB with a false-positive reduction.

Embodiments thus represent a two-stage algorithm for the automatic detection of plasmodia in thick blood films. Selected embodiments concentrate on the detection of *Plasmodium falciparum* parasites, as this type is responsible for approximately 80% of all malaria cases and for approximately 90% of all deaths due to malaria. In contrast to the documents mentioned in the introductory part, the approach deals with the problem of an exact plasmodia detection in case of a low plasmodia density (less than five plasmodia per image). The results show that a high plasmodia detection sensitivity (0.97) combined with low numbers of false-positive detections per image (0.8) may be acquired. This shows that the approach is suitable for developing an automatic microscope for computer-aided malaria screening. According to the WHO guidelines, 100 highly magnified fields of a thick blood film are to be examined for malaria detection. This tiring and time-consuming process could be reduced to a less time-consuming examination of the ROIs for the detection of plasmodia candidates output by the presented algorithm.

In summary it may be said that malaria is caused by a blood parasite of the species of *plasmodium* and kills millions of people each year. According to indications of the World Health Organization, the standard for the diagnosis of malaria is the microscopic examination of a colored blood film. A two-stage algorithm for the automatic detection of plasmodia in thick blood films was developed. The focus of the first stage (for example in the form of step 403 of the method 400) is on high detection sensitivity, while large numbers of false-positive detections per image are accepted. The second stage (for example in the form of step 404 of the method 400) reduces the number of false-positive detections to an acceptable level, while the detection sensitivity of the first stage is maintained. The algorithm may detect plasmodia with a sensitivity of 0.97 with an average number of 0.8 false-positive detections per image. The results here suggest that the proposed algorithm for the development of an automatic microscope is suitable for computer-aided malaria screening. Devices and methods according to embodiments may thus contribute to a more effective automatic identification of malaria.

Embodiments of the present invention thus present an approach for solving the problem of the automatic diagnosis of malaria on the basis of thick blood films and more specifically for the automatic detection of plasmodia in thick blood films. Embodiments of the present invention thus allow, in contrast to the methods indicated in the introductory part of this application, the computer-aided diagnosis of malaria already at an early stage.

Embodiments of the present invention thus provide a method and a system for the computer-aided microscopy for the automatic detection of plasmodia in thick blood films.

Although some aspects were described in connection with a device, it is obvious that those aspects also represent the description of the corresponding method, so that a block or a component of a device may also be regarded as a corresponding method step or as a feature of a method step. Analog to this, aspects which were described in connection with or as a method step also represent a description of a corresponding block or detail or feature of a corresponding device.

Depending on certain implementation requirements, embodiments of the invention may be implemented in hardware or in software. The implementation may be executed using a digital storage medium, for example a floppy disc, a DVD, a Blu-ray disc, a CD, an ROM, a PROM, an EPROM, an EEPROM or a FLASH memory, a hard disc or another magnetic or optical memory on which electronically readable control signals are stored which may cooperate or do cooperate with a programmable computer system such that the respective method is executed. Thus, the digital storage medium may be computer-readable. Some embodiments according to the invention consequently include a data carrier comprising electronically readable control signals which are able to cooperate with a programmable computer system such that one of the methods described herein is executed.

In general, embodiments of the present invention may be implemented as a computer program product having a program code, wherein the program code is operable in order to execute one of the methods when the computer program product is executed on a computer. The program code may, for example, be stored on a machine-readable carrier.

Other embodiments include the computer program for executing one of the methods described herein, wherein the computer program is stored on a machine-readable carrier.

In other words, an embodiment of the inventive method thus is a computer program comprising a program code for executing one of the methods described herein when the computer program is executed on a computer. A further embodiment of the inventive method is thus a data carrier (or a digital storage medium or a computer-readable medium) on which the computer program for executing one of the methods described herein is recorded.

A further embodiment of the inventive method thus is a data stream or a sequence of signals which represent the computer program for executing one of the methods described herein. The data stream or the sequence of signals may, for example, be configured in order to be transferred via a data communication connection, for example via the interne.

A further embodiment includes a processing means, for example a computer or a programmable logic device configured or adapted in order to execute one of the methods described herein.

A further embodiments includes a computer on which the computer program for executing one of the methods described herein is installed.

In some embodiments a programmable logic device (for example a field-programmable gate array, an FPGA) may be used to execute some or all functionalities of the methods described herein. In some embodiments, a field-programmable gate array may cooperate with a microprocessor to execute one of the methods described herein. In general, the methods are in some embodiments executed using any hardware device. The same may be universally usable hardware such as a computer processor (CPU) or hardware which is specific for the method, such as, for example, an ASIC.

The above-described embodiments merely present an illustration of the principles of the present invention. It is obvious that modifications and variations of the arrangements and details described herein will be obvious to other persons skilled in the art. The invention is thus only to be limited by the scope of the appended patent claims and not by the specific details presented herein by the description and the explanation of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for determining objects in a color recording, comprising:
    an identifier which is implemented to identify connected regions whose size or shape corresponds to a predetermined condition from a plurality of connected regions corresponding to chromatin-comprising objects and existing in a binary image derived from the color recording based on a ratio of green components with respect to blue components in the color recording, based on a shape or a size of the connected regions;
    a feature extractor for extracting a feature set for each of the identified connected regions from the color recording;
    a classifier for classifying the identified connected regions into at least two disjunct groups based on the extracted feature sets for the identified connected regions; and
    wherein the objects to be determined are plasmodia and the color recording is a visual field of at least a part of a thick blood film.

2. The device according to claim 1,
    wherein the feature extractor is implemented to extract the feature sets of the identified connected regions from sections of the color recording in which the respective identified connected regions are located.

3. The device according to claim 2,
    wherein the feature extractor is implemented such that a size of the sections is identical for all sections and a surface of the sections corresponds at least to a largest possible surface of the objects to be determined, wherein the largest possible surface of the objects to be determined is determined by the predetermined condition.

4. The device according to claim 2,
wherein the feature extractor is implemented such that the sections of the color recording are centered to the respective identified connected region which is located within the same.

5. The device according to claim 1,
wherein the classifier is implemented to allocate the extracted feature sets to one of the two disjunct groups using reference feature sets received in a training phase and thus allocate the identified connected regions for which the extracted feature sets are extracted.

6. The device according to claim 1,
wherein the feature extractor is implemented such that the extracted feature sets comprise at least one of the following features on the associated identified connected regions:
form features, texture features, color features; and
wherein the classifier is implemented to classify the identified connected regions into the disjunct groups based on the comprised features.

7. The device according to claim 1,
further comprising a binary image provider which is implemented to generate a grayscale image by a color-to-gray scale imaging of the color recording and to generate the binary image from the grayscale image.

8. The device according to claim 7,
wherein the binary image provider is implemented to divide the portion within the binary image in which the binary image comprises a predetermined binary value into separated but connected regions representing the plurality of connected regions among which the identification is executed.

9. The device according to claim 7,
wherein the binary image provider is implemented, in the generation of the binary image from the grayscale image, to subject the grayscale image to a high-pass filtering, to acquire a filtered grayscale image as a result of filtering, determine a threshold value from the filtered grayscale image and, based on the determined threshold value, generate the binary image from the intensified grayscale image.

10. The device according to claim 9,
wherein the binary image provider is implemented to subject the grayscale image to a "black top hat" filtering;
wherein a surface of a "black top hat" structural element is selected such that the same corresponds to at least a largest possible surface of the objects to be determined, wherein the largest possible surface of the objects to be determined is determined by the predetermined condition.

11. The device according to claim 7,
further comprising a grayscale image provider which is implemented to provide the grayscale image based on a green channel and a blue channel of the color recording.

12. The device according to claim 1,
wherein the classifier classifies the identified connected regions into the disjunct groups such that the identified connected regions which are associated with a first group of the disjunct groups form the objects to be determined existing in the color recording.

13. The device according to claim 1,
further comprising a characterizer which is implemented to characterize all identified connected regions associated with a first group of the disjunct groups into a plurality of disjunct characterization groups based on the extracted feature sets for the identified connected regions of the first disjunct group.

14. A method for determining objects in a color recording, comprising:
identifying connected regions whose size or shape corresponds to a predetermined condition from a plurality of connected regions corresponding to chromatin-comprising objects and existing in a binary image derived from the color recording based on a ratio of green components with respect to blue components in the color recording, based on a shape or a size of the connected regions;
extracting a feature set for each of the identified connected regions from the color recording; and
classifying the identified connected regions into at least two disjunct groups based on the extracted feature sets for the identified connected regions;
wherein the color recording detects at least a partial area of a thick blood film and wherein the objects to be determined are plasmodia existing in the thick blood film.

15. The method according to claim 14,
wherein in the step of extracting the feature sets, the feature sets of the identified connected regions are extracted from sections of the color recording in which the respective identified connected regions lie and are centered to, and wherein a size and shape of the sections is identical for all identified connected regions.

16. The method according to claim 14,
wherein in the step of classifying the extracted feature sets are compared to reference feature sets to allocate each identified connected region to exactly one of the disjunct groups as a result of the comparison.

17. The method according to claim 14,
comprising a step of providing the binary image based on a grayscale image of the recording before the step of identifying; and
wherein in the step of providing the binary image the grayscale image is subjected to filtering such that a contrast between areas of the color recording in which objects to be determined lie and areas of the color recording in which objects to be determined do not lie is intensified to acquire a filtered grayscale image as a result of filtering; and
wherein in the step of providing the binary image, further the filtered grayscale image is transformed into the binary image utilizing a threshold value method.

18. The method according to claim 17,
further comprising, before the step of providing the binary image, a step of providing the grayscale image, wherein the color recording is transformed based on at least a green channel and a blue channel into the grayscale image.

19. The method according to claim 14,
further comprising, after the step of classifying, a step of characterizing all identified connected regions associated with a first of the two disjunct groups into a plurality of disjunct characterization groups based on the extracted feature sets for the identified connected regions.

20. A method for determining plasmodia in a thick blood film, comprising:
generating a thick blood film on an object carrier;
localization of the thick blood film on the object carrier;
making a plurality of color recordings of the thick blood film, wherein each of the color recordings detects at least a partial area of the thick blood film; and
determining the plasmodia present in every color recording using the method according to claim 14 for each color recording.

21. The method according to claim 20, wherein in the step of making the plurality of color recordings for each partial area detected by a color recording of the thick blood film at least three color recordings are made which detect the same partial area but comprise different focal planes.

22. The method according to claim 20, further comprising, after the step of determining plasmodia existing in each color recording, a step of generating a thin blood film and determining the plasmodia existing in the thin blood film.

23. A non-transitory computer readable medium including a computer program comprising a program code for executing the method according to claim 15, when the program is executed on a computer.

24. A non-transitory computer readable medium including a computer program comprising a program code for executing the method according to claim 20, when the program is executed on a computer.

* * * * *